US012620577B2

(12) United States Patent
Choi et al.

(10) Patent No.: US 12,620,577 B2
(45) Date of Patent: May 5, 2026

(54) POSITIVE ELECTRODE ACTIVE MATERIAL AND LITHIUM SECONDARY BATTERY COMPRISING THE SAME

(71) Applicant: ECOPRO BM CO., LTD., Cheongju-si (KR)

(72) Inventors: Moon Ho Choi, Cheongju-si (KR); Gyeong Jae Heo, Cheongju-si (KR); Hyun Jong Yu, Cheongju-si (KR); Seung Hyun Choi, Cheongju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 124 days.

(21) Appl. No.: 16/545,086

(22) Filed: Aug. 20, 2019

(65) Prior Publication Data

US 2020/0067083 A1 Feb. 27, 2020

(30) Foreign Application Priority Data

| Aug. 22, 2018 | (KR) | .......................... | 10-2018-0098186 |
| Sep. 18, 2018 | (KR) | .......................... | 10-2018-0111347 |
| May 29, 2019 | (KR) | .......................... | 10-2019-0062986 |
| Jul. 9, 2019 | (KR) | .......................... | 10-2019-0082546 |

(51) Int. Cl.
| H01M 4/36 | (2006.01) |
| H01M 4/505 | (2010.01) |
| H01M 4/525 | (2010.01) |
| H01M 10/0525 | (2010.01) |
| H01M 4/02 | (2006.01) |

(52) U.S. Cl.
CPC ........... *H01M 4/366* (2013.01); *H01M 4/505* (2013.01); *H01M 4/525* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| 2009/0068561 A1* | 3/2009 | Sun ....................... | H01M 4/131 |
| | | | 429/223 |
| 2011/0195309 A1 | 8/2011 | Nina et al. | |
| 2013/0236787 A1* | 9/2013 | Sato ....................... | C01G 51/50 |
| | | | 429/223 |

(Continued)

FOREIGN PATENT DOCUMENTS

| CN | 102148356 A | 8/2011 | |
| CN | 105024052 A | * 11/2015 | ........ H01M 10/0525 |

(Continued)

OTHER PUBLICATIONS

Prabaharan et al ("Li2NiTiO4—a new positive electrode for lithium batteries: soft-chemistry synthesis and electrochemical characterization", Solid State Ionics, 172, p. 39-45, 2004.*
Du et al ("Pre-introducing Li4NiWO6 defect phase by tungsten modification enables highly stabilized Ni-rich cathode", Chemical Engineering Journal, 492, (2024), 152357).*
The extended European search report issued by the European Patent Office on Jan. 30, 2020, which corresponds to European Patent Application No. 19192876.1-1106 and is related to U.S. Appl. No. 16/545,086.

(Continued)

*Primary Examiner* — Jonathan G Leong
*Assistant Examiner* — Tony S Chuo
(74) *Attorney, Agent, or Firm* — Studebaker Brackett PLLC

(57) ABSTRACT

The present invention relates to a positive electrode active material, and a lithium secondary battery comprising a positive electrode including the positive electrode active material.

9 Claims, 6 Drawing Sheets

(56) References Cited

U.S. PATENT DOCUMENTS

| | | | | |
|---|---|---|---|---|
| 2014/0045067 A1* | 2/2014 | Cho | .................. | C01G 45/1228 |
| | | | | 429/220 |
| 2016/0020458 A1* | 1/2016 | Choi | .................... | H01M 4/505 |
| | | | | 252/182.1 |
| 2016/0049645 A1* | 2/2016 | Zheng | .................. | H01M 4/505 |
| | | | | 429/223 |
| 2018/0233739 A1 | 8/2018 | Park et al. | | |

FOREIGN PATENT DOCUMENTS

| | | | | |
|---|---|---|---|---|
| CN | 105161679 A | * 12/2015 | ........ | H01M 10/0525 |
| CN | 107636866 A | 1/2018 | | |
| EP | 3 282 506 A1 | 2/2018 | | |
| EP | 3 331 067 A1 | 6/2018 | | |
| JP | 2017-134996 A | 8/2017 | | |
| KR | 10-2013-0108717 A | 10/2013 | | |
| KR | 10-2013-0117340 A | 10/2013 | | |
| KR | 10-2015-0069334 A | 6/2015 | | |
| KR | 10-2017-0063395 A | 6/2017 | | |
| KR | 10-2017-0063407 A | 6/2017 | | |
| KR | 10-2017-0075654 A | 7/2017 | | |
| KR | 10-2018-0057864 A | 5/2018 | | |
| WO | 2013/145913 A1 | 10/2013 | | |
| WO | WO 2017/203420 A1 * | 11/2017 | ............. | H01M 4/36 |

OTHER PUBLICATIONS

Jie-Nan Zhang et al., "Improved electrochemical performances of high voltage LiCoO2 with tungsten doping", Chinese Physics B, vol. 27, No. 8, Jul. 25, 2018, pp. 088202 (1-7), DOI: 10.1088/1674-1056/27/8/088202.

Yang-Kook Sun et al., "Synthesis and Characterization of Li[(Ni0.8Co0.1Mn0.1)0.8(Ni0.5Mn0.5)0.2]O2 with the Microscale Core-Shell Structure as the Positive Electrode Material for Lithium Batteries," Journal of the American Chemical Society, vol. 127 no. 38, pp. 13411-13418, Aug. 31, 2005, doi: 10.1021/ja053675g.

Dao Young Wan et al., Effect of Metal (Mn, Ti) Doping on NCA Cathode Materials for Lithium Ion Batteries (Hindawi Journal of Nanomaterials, vol. 2018, Article ID 8082502, 9 pages).

Zhang et al., Mechanical Composite of LiNi0.8Co0.15AI0.05O2/ Carbon Nanotubes with Enhanced Electrochemical Performance for Lithium-Ion Batteries (Nanoscale Research Letters (2017) 12:376, DOI 10.1186/s11671-017-2143-4).

Hongyang Li et al., Synthesis of Single Crystal LiNi0.6Mn0.2Co0.2O2 with Enhanced Electrochemical Performance for Lithium Ion Batteries (Journal of The Electrochemical Society, 165 (5) A1038-A1045 (2018)).

* cited by examiner

FIG. 3

POSITIVE ELECTRODE ACTIVE MATERIAL AND LITHIUM SECONDARY BATTERY COMPRISING THE SAME

CROSS-REFERENCE TO RELATED APPLICATION

This application claims priority to and the benefit of Korean Patent Application No. 10-2018-0098186, filed on Aug. 22, 2018, Korean Patent Application No. 10-2018-0111347, filed on Sep. 18, 2018, Korean Patent Application No. 10-2019-0062986, filed on May 29, 2019, and Korean Patent Application No. 10-2019-0082546, filed on Jul. 9, 2019, the disclosure of which is incorporated herein by reference in its entirety.

BACKGROUND

1. Field of the Invention

The present invention relates to a positive electrode active material, and a lithium secondary battery comprising a positive electrode including the positive electrode active material.

2. Discussion of Related Art

Batteries store electrical power by using materials facilitating an electrochemical reaction with a positive electrode and a negative electrode. As a representative example of such batteries, there is a lithium secondary battery storing electrical energy due to a difference in chemical potential when lithium ions are intercalated/deintercalated into/from a positive electrode and a negative electrode.

The lithium secondary battery uses materials enabling reversible intercalation/deintercalation of lithium ions as positive electrode and negative electrode active materials, and is produced by charging an organic electrolyte solution or a polymer electrolyte solution between the positive electrode and the negative electrode.

A lithium composite oxide is used as a positive electrode active material of the lithium secondary battery, and composite oxides such as $LiCoO_2$, $LiMn_2O_4$, $LiNiO_2$, $LiMnO_2$, etc. are being studied.

Among the positive electrode active materials, while $LiCoO_2$ is most widely used due to excellent lifespan characteristics and charge/discharge efficiency, it is expensive because of the resource limit of cobalt used as a raw material, and has a disadvantage that price competitiveness is limited.

Lithium manganese oxides such as $LiMnO_2$, $LiMn_2O_4$, etc. have advantages of excellent thermal safety and low costs, but also have problems of small capacity and poor high-temperature characteristics. In addition, while a $LiNiO_2$-based positive electrode active material exhibits a battery characteristic of high discharge capacity, due to cation mixing between Li and a transition metal, it is difficult to synthesize the $LiNiO_2$-based positive electrode active material, thereby causing a greater problem in rate characteristic.

In addition, depending on the intensification of such cation mixing, a large amount of Li by-products is generated, and since most of the Li by-products consist of a compound of LiOH and $Li_2CO_3$, they become a cause of gelation in preparation of a positive electrode paste and gas generation according to charge/discharge progression after the preparation of an electrode.

Residual $Li_2CO_3$ increases the swelling phenomenon of a cell and thus reduces cycles and also leads to the swelling of a battery.

SUMMARY

To solve various problems of a conventional positive electrode active material for a lithium secondary battery, the present invention is directed to providing a positive electrode active material which is improved in structural stability and conductivity of lithium ions.

The present invention is also directed to providing a positive electrode active material which includes different types of composite oxides defined herein, and thereby is improved in high temperature storage stability and lifespan characteristics.

The present invention is also directed to providing a lithium secondary battery comprising a positive electrode including the positive electrode active material defined herein.

The objects of the present invention are not limited to the above-mentioned objects, and other objects and advantages of the present invention which are not mentioned can be understood by the following description and more clearly understood by exemplary embodiments of the present invention. In addition, it will be readily apparent that the objects and advantages of the present invention may be realized by means indicated in the claims and a combination thereof.

One aspect of the present invention may provide a positive electrode active material which includes a first composite oxide enabling lithium intercalation and deintercalation and a second composite oxide present on at least a part of the surface of the first composite oxide and in a state of forming a solid solution with the first composite oxide.

Here, the second composite oxide may be represented by Formula 1 below.

$$Li_aM1_bM2_cO_d \qquad \text{[Formula 1]}$$

(Here, M1 is at least one selected from Ni, Mn, Co, Cu, Nb, Mo, Al, Zn, Mg, Ce and Sn, M2 is at least one selected from Mn, Al, Ti, Zr, Mg, V, B, Mo, Zn, Nb, Ba, Ta, Fe, Cr, Sn, Hf, Ce, W, Nd and Gd, M1 and M2 are different from each other, $0 \le a \le 6$, $0 \le b \le 2$, $0 \le c \le 2$, and $4 \le d \le 8$)

Another aspect of the present invention may provide a lithium secondary battery comprising a positive electrode including the positive electrode active material defined herein.

BRIEF DESCRIPTION OF THE DRAWINGS

FIGS. 3 to 5 are graphs showing the results of XRD analysis for a positive electrode active material prepared according to an exemplary embodiment of the present invention.

DETAILED DESCRIPTION

Figure 1:
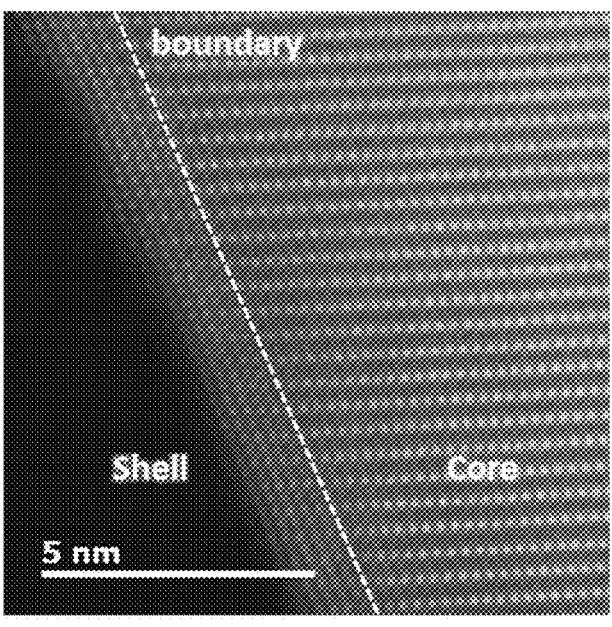
FIG. 1 shows the result of transmission electron microscope (TEM) analysis for one surface of a positive electrode active material prepared according to an exemplary embodiment of the present invention.

To facilitate a better understanding of the present invention, specific terms are defined in the present invention for convenience. Unless particularly defined otherwise, scientific and technical terms used herein will have meanings generally understood by those of ordinary skill in the art. In addition, it should be understood that, unless particularly indicated in the context, the singular forms include plural forms thereof, and the plural terms also include singular forms thereof.

Hereinafter, a positive electrode active material according to the present invention and a lithium secondary battery comprising a positive electrode including the positive electrode active material will be described in further detail. Positive Electrode Active Material According to an aspect of the present invention, a positive electrode active material including a first composite oxide enabling lithium intercalation and deintercalation and a second composite oxide present on at least a part of the surface of the first composite oxide may be provided.

Here, the first and second composite oxides in the positive electrode active material may be present in a state of forming a solid solution.

For example, when the first composite oxide is A, and the second composite oxide is B, the solid solution formed of the first composite oxide and the second composite oxide may be present in the form of $(AB)_p$ or $(A)_q(B)_r$.

However, the solid solution defined herein is a solid solution in the form of $(A)_q(B)_r$, wherein the $(A)_q$ part may correspond to a core of a primary particle forming the positive electrode active material, and the $(B)_r$ part may correspond to a shell of the primary particle forming the positive electrode active material. Accordingly, it should be understood that the solid solution of the first composite oxide and the second composite oxide defined herein refers to a core-shell particle present in the form of a core-shell particle in which a core including the first composite oxide and a shell layer including the second composite oxide form a solid solution. Here, the shell layer may be present to cover a part or all of the surface of the core, and the second composite oxide may be present in a part or all of the shell layer. Here, it may be also understood that the second composite oxide present in the shell layer refers to a region corresponding to the second composite oxide of the solid solution.

As described above, the solid solution formed by the first composite oxide and the second composite oxide is present in the form of a core-shell particle, and the core-shell particle may have a spherical shape, a rod shape, an oval shape and/or an irregular shape.

In addition, the positive electrode active material may be the core-shell particle, a single secondary particle formed by aggregating the core-shell particles, or an aggregate formed by gathering a plurality of secondary particles.

The secondary composite oxide defined herein may be defined as a particle represented by Formula 1 below. Formula 1 below is provided to independently specify the above-mentioned secondary composite oxide, and when the second composite oxide presented in the positive electrode active material according to an aspect of the present invention forms a solid solution with the first composite oxide, the solid solution may be represented by Formula 3 to be described below.

$$Li_aM1_bM2_cO_d \qquad \text{[Formula 1]}$$

(Here,

M1 is at least one selected from Ni, Mn, Co, Cu, Nb, Mo, Al, Zn, Mg, Ce and Sn,

M2 is at least one selected from Mn, Al, Ti, Zr, Mg, V, B, Mo, Zn, Nb, Ba, Ta, Fe, Cr, Sn, Hf, Ce, W, Nd and Gd, M1 and M2 are different from each other, $0 \le a \le 6$, $0 < b \le 2$, $0 \le c \le 2$, and $4 \le d \le 8$)

More specifically, M1 may be at least one selected from Mn, Mg, Co and Ni.

For example, when M1 is Ni and M2 is W, the second composite oxide may be represented by Formula $Li_aNi_bW_cO_d$. In addition, when M1 is Co, and M2 is W, the second composite oxide may be presented by Formula $Li_aCo_bW_cO_d$. In addition, when M1 is Mn and M2 is W, the second composite oxide may be represented by Formula $Li_aMn_bW_cO_d$. In addition, when M1 is Mg, and M2 is W, the second composite oxide may be represented by Formula $Li_aMg_bW_cO_d$.

Here, the second composite oxide may refer to one composite oxide selected from a composite oxide represented by Formula $Li_aNi_bW_cO_d$, a composite oxide represented by Formula $Li_aCo_bW_cO_d$, a composite oxide represented by Formula $Li_aMn_bW_cO_d$ and a composite oxide represented by Formula $Li_aMg_bW_cO_d$, or may simultaneously include a plurality of composite oxides selected from a composite oxide represented by Formula $Li_aNi_bW_cO_d$, a composite oxide represented by Formula $Li_aCo_bW_cO_d$, a composite oxide represented by Formula $Li_aMn_bW_cO_d$ and a composite oxide represented by Formula $Li_aMg_bW_cO_d$. Here, the composite oxide represented by $Li_aNi_bW_cO_d$ may be a composite oxide represented by $Li_4NiWO_6$, $Li_3NiWO_6$ and/or $Li_2Ni(WO_4)_2$, but the present invention is not limited thereto.

In addition, in another exemplary embodiment, M1 in Formula 1 representing the second composite oxide may be two types of metal elements. For example, the second composite oxide may refer to one composite oxide selected from a composite oxide represented by Formula $Li_a(Ni+Co)_b W_cO_d$, a composite oxide represented by Formula $Li_a(Ni+Mn)_bW_cO_d$ and a composite oxide represented by Formula $Li_a(Ni+Mg)_bW_cO_d$, or simultaneously include any combination of composite oxides selected from a composite oxide represented by Formula $Li_aNi_bW_cO_d$, a composite oxide represented by Formula $Li_aCo_bW_cO_d$, a composite oxide represented by Formula $Li_aMn_bW_cO_d$, a composite oxide represented by Formula $Li_aMg_bW_cO_d$, a composite oxide represented by Formula $Li_a(Ni+Co)_bW_cO_d$, a composite oxide represented by Formula $Li_a(Ni+Mn)_bW_cO_d$ and a composite oxide represented by Formula $Li_a(Ni+Mg)_b W_cO_d$.

As described above, provided that the structural stability and thermal stability of the positive electrode active material can be improved by forming a solid solution with the second composite oxide and the first composite oxide, the second composite oxide may have various compositions according to types of M1 and M2.

Here, the second composite oxide may have a crystal structure which is the same as or different from the first composite oxide. For example, the second composite oxide may have at least one crystal structure selected from a monoclinic system, a triclinic system and a cubic system. In addition, the second composite oxide present in the shell layer may be a lithium-rich metal oxide.

As a specific example, the second composite oxide in which M1 is Ni and M2 is W, and which has a monoclinic crystal system may be represented by Formula $Li_aNi_bW_cO_d$, and the second composite oxide having a triclinic crystal system may be represented by Formula $Li_aNi_b(W_cO_d)_2$.

Meanwhile, in a real SEM or TEM image of the positive electrode active material, it may be difficult to distinguish between the core and the shell layer by an obvious boundary, but, in the present invention, to facilitate understanding of the contents described in the specification, the structure of the positive electrode active material will be explained by dividing it into a core and a shell layer.

That is, in the present invention, the core may be defined as a region in which the first composite oxide is present, the shell layer may be defined as a region in which the second composite oxide is present, and the thicknesses or sizes of the core and the shell layer may vary according to depths of regions in which the first composite oxide and the second composite oxide are present.

Here, the thickness of the shell layer may be 20 nm, preferably 10 nm, and more preferably 5 nm or less, but the present invention is not necessarily limited thereto.

In addition, it should be understood that, when the shell layer is present on a part of the surface of the core, the first composite oxide may be exposed at the surface of the core on which the shell layer is not present.

The first composite oxide defined herein may be defined as a particle represented by Formula 2 below.

$$Li_wNi_{1-(x+y+z)}Co_xM3_yM4_zO_2 \qquad \text{[Formula 2]}$$

(Here,

M3 is at least one selected from Mn and Al,

M4 is at least one selected from Mn, Al, Ti, Zr, Mg, V, B, Mo, Zn, Nb, Ba, Ta, Fe, Cr, Sn, Hf, Ce, W, Nd and Gd, $0.5 \leq w \leq 1.2$, $0.01 \leq x \leq 0.50$, $0.01 \leq y \leq 0.20$, and $0.001 \leq z \leq 0.20$)

The core-shell particle may come into contact with a neighboring core-shell particle to form an interface or grain boundary between the core-shell particles. In addition, the core-shell particle may be spaced apart from a neighboring core-shell particle in the secondary particle, thereby forming an inner pore.

Here, the average diameter of the core-shell particle may be 0.1 to 6.0 μm, and the average diameter of the secondary particle may be 6.0 to 20.0 μm. Here, the core-shell particle may come into contact with neighboring core-shell particles to come into contact with the inner pore without forming a grain boundary, and thus a surface present in the secondary particle may be formed. Meanwhile, the surface on which the core-shell particle present on the outermost surface of the secondary particle is exposed to an external atmosphere forms the surface of the secondary particle.

In addition, M2 and/or M4 included in the core-shell particle present on the surface of the secondary particle may have a concentration gradient decreasing toward the center of the secondary particle. That is, a direction of the concentration gradient of M2 and/or M4 formed in the core-shell particle may be a direction toward the center of the secondary particle from the surface of the secondary particle.

More specifically, the concentration of M2 and/or M4 included in the core-shell particle may be greater at the surface of the secondary particle than at the center of the secondary particle on the basis of the center of the core-shell particle.

In this case, the secondary particle may include a first region and a second region, which have different M2 and/or M4 concentrations.

Here, the region in which M2 and/or M4 included in the core-shell particle has(have) a concentration gradient decreasing toward the center of the secondary particle may be a first region. That is, the concentration gradient of M2 and/or M4 defined herein refers to a concentration gradient shown on the basis of a single core-shell particle.

For example, when a distance from the outermost surface of the secondary particle forming the lithium composite oxide to the center of the secondary particle is R, a region in which a distance (R') from the outermost surface of the secondary particle is 0 to 0.02R is defined as a first region, M2 and/or M4 present in the first region may have a concentration gradient decreasing toward the center of the secondary particle in the core-shell particle.

However, opposite to M2 and/or M4, Ni present in the first region may have a concentration gradient increasing toward the center of the secondary particle in the core-shell particle. Here, the center of the secondary particle may refer to the very center of the secondary particle.

Here, the concentration variation of M2 and/or M4 included in the core-shell particle present in the first region may be 50% or more, and preferably 60% or more, but the present invention is not necessarily limited thereto.

In addition, the other region excluding the first region may be defined as a second region, and when a region in which a distance (R') from the outermost surface of the secondary particle is 0 to 0.02R is defined as a first region, a region in which a distance (R') from the outermost surface of the secondary particle is more than 0.02R to 1.0R may be defined as a second region. Here, M2 and/or M4 included in the core-shell particle present in the second region may not have a concentration gradient in the manner of an increasing or decreasing concentration in a certain direction in the core-shell particle.

In another exemplary embodiment, the concentration variation of M2 and/or M4 in the core-shell particle present in the second region may be 49% or less, preferably 30% or less, and more preferably 15% or less.

In addition, in this case, the concentration variation of Co and M3 included in the core-shell particles present in the first region and the second region may be 49% or less, preferably 30% or less, and more preferably 15% or less.

As described above, the secondary particle constituting the lithium composite oxide is partitioned into a first region and a second region, which have different M2 and/or M4 concentration(s), and M2 and/or M4 may exhibit different aspects of concentration gradients in the first region and the second region, thereby improving the structural stability and thermal stability (high-temperature storage stability) of the lithium composite oxide.

In addition, as lithium ion conductivity in the active material is improved, the positive electrode active material including the core having the above-described concentration gradient may also be improved in lifespan characteristics, efficiency characteristics and electrochemical characteristics such as resistance, compared to the conventional positive electrode active material.

A described above, the second composite oxide present on at least a part of the surface of the first composite oxide may be present while forming a solid solution with the first composite oxide.

Here, the solid solution may be represented by Formula 3 below.

$$Li_aM1_bM2_cO_d—Li_wNi_{1-(x+y+z)}Co_xM3_yM4_zO_2 \qquad \text{[Formula 3]}$$

(Here,

M1 is at least one selected from Ni, Mn, Co, Cu, Nb, Mo, Al, Zn, Mg, Ce and Sn,

M2 is at least one selected from Mn, Al, Ti, Zr, Mg, V, B, Mo, Zn, Nb, Ba, Ta, Fe, Cr, Sn, Hf, Ce, W, Nd and Gd, M3 is at least one selected from Mn and Al, M4 is at least one selected from Mn, Al, Ti, Zr, Mg, V, B, Mo, Zn, Nb, Ba, Ta, Fe, Cr, Sn, Hf, Ce, W, Nd and Gd, M1 and M2 are different from each other, $0 \leq a \leq 6$, $0 < b \leq 2$, $0 < c \leq 2$, $4 \leq d \leq 8$, 0.5≤w≤1.5, 0.01≤x≤0.50, 0.01≤y≤0.20, and 0.001≤z≤0.20)

More specifically, M2 may be the same as M4 or a part of M4. That is, when each of M2 and M4 is a single element, M2 and M4 may be the same as each other, and when each of M2 and M4 include multiple elements, all or a part of M2 may be the same as all or a part of M4.

Here, when all or a part of M2 is the same as all or a part of M4, M2 and M4 may have concentration gradients decreasing toward the center of the positive electrode active material from the surface of the positive electrode active material.

In another exemplary embodiment, the solid solution may be represented by Formula 3-1 below.

$$Li_aM1_bW_cO_d\text{---}Li_wNi_{1-(x+y+z)}Co_xM2_yM3_zO_2 \quad \text{[Formula 3-1]}$$

(Here,

M1 is at least one selected from Ni, Mn, Co, Fe, Cu, Nb, Mo, Ti, Al, Cr, Zr, Zn, Na, K, Ca, Mg, Pt, Au, B, P, Eu, Sm, Ce, V, Ba, Ta, Sn, Hf, Ce, Gd and Nd, M2 is at least one selected from Mn and Al, M3 is at least one selected from Mn, Al, Ti, Zr, Mg, V, B, Mo, Zn, Nb, Ba, Ta, Fe, Cr, Sn, Hf, Ce, W, Nd and Gd, 0≤a≤6, 0≤b≤2, 0≤c≤2, 4≤d≤8, 0.5≤w≤1.5, 0.01≤x≤0.50, 0.01≤y≤0.20, and 0.001≤z≤0.20)

Here, M3 may be W or include W. That is, when M3 is a single element, M3 is W, but when M3 includes multiple elements, M3 may include W and an element other than W. When M3 is W or includes W, W and (if present) an element other than W may have concentration gradients decreasing toward the center of the positive electrode active material from the surface of the positive electrode active material.

The presence or absence of the solid solution(s) represented by Formula 3 and/or Formula 3-1 in the positive electrode active material may be verified by XPS analysis, Raman shift analysis and/or XRD analysis.

As a result of the XRD analysis, when there is a lithium composite oxide in the form of a solid solution represented by Formula 3 and/or Formula 3-1, the solid solution may simultaneously have both diffraction peak characteristics of the first composite oxide and the second composite oxide.

For example, in the case of the solid solution represented by Formula 3, when the solid solution is formed of a second composite oxide in which M1 is Ni and M2 is W and a first composite oxide in which M3 is Al and M4 is W, the solid solution may be represented by Formula $Li_aNi_bW_cO_d\text{---}Li_wNi_{1-(x+y+z)}Co_xAl_yW_zO_2$, and here, the solid solution may have both of a diffraction peak characteristic specific for $Li_aNi_bW_cO_d$ and a diffraction peak characteristic specific for $Li_wNi_{1-(x+y+z)}Co_xAl_yW_zO_2$.

In addition, in the case of the solid solution represented by Formula 3-1, when a solid solution is formed of a second composite oxide in which M1 is Ni and a first composite oxide in which M2 is Al and M3 is W, the solid solution may be represented by Formula $Li_aNi_bW_cO_d\text{---}Li_wNi_{1-(x+y+z)}Co_x\text{-}Al_yW_zO_2$, and here, the solid solution may have both of a diffraction peak characteristic specific for $Li_aNi_bW_cO_d$ and a diffraction peak characteristic specific for $Li_wNi_{1-(x+y+z)}CO_xAl_yW_zO_2$.

In this case, through X-ray diffraction (XRD) analysis using a CuKα ray for the lithium composite oxide, the lithium composite oxide(s) in the form of the solid solution(s) represented by Formula 3 and/or Formula 3-1 may have peaks corresponding to the (001) crystal face and the (003) crystal face in a X-ray diffraction spectrum range of 2θ=15° to 200, and a peak corresponding to the (104) crystal face in a range of 2θ=44° to 500. In addition, the lithium composite oxide(s) in the form of a solid solution(s) represented by Formula 3 and/or Formula 3-1 may have a peak corresponding to the (20-2) crystal face in the range of 2θ=42° to 44°.

In addition, through XPS analysis for the lithium composite oxide, in the case of W4f and O1s peaks, the lithium composite oxide in the form of the solid solution represented by Formula 3-1 may have both of a peak characteristic specific for $Li_aNi_bW_cO_d$ and a peak characteristic specific for $Li_wNi_{1-(x+y+z)}Co_xAl_yW_zO_2$.

Specifically, in the XPS analysis for the lithium composite oxide, a peak corresponding to $W4f_{7/2}$ may be present at 35.5 eV or less, and preferably in a range of 34.0 to 35.0 eV.

In addition, in the XPS analysis for the lithium composite oxide, a peak corresponding to $W4f_{7/2}$ may be present at 37.5 eV or less, and preferably in a range of 36.0 to 37.0 eV.

The $W4f_{7/2}$ peak for $W^{6+}$ of the oxide having a $Li_aNi_bW_cO_d$ composition may be present in a range of 34.0 to 35.0 eV, and the $W4f_{5/2}$ peak may be present in the range of 36.0 to 37.0 eV. On the other hand, it can be confirmed that the $W4f_{7/2}$ peak for $O^{2-}$ of the oxide having a $Li_aW_cO_d$ or $W_cO_d$ composition is present in a range exceeding 35.0 eV, and the $W4f_{5/2}$ peak may be present in a range exceeding 37.0 eV.

Therefore, in the XPS analysis for the lithium composite oxide included in a positive electrode active material according to an exemplary embodiment of the present invention, the $W4f_{7/2}$ peak is present in a range of 34.0 to 35.0 eV, and the $W4f_{5/2}$ peak is present in a range of 36.0 to 37.0 eV, and thus the lithium composite oxide exhibits a unique peak of $Li_aNi_bW_cO_d$.

In addition, in the XPS analysis for the lithium composite oxide, a peak corresponding to O1s may be present in a range of 528.0 to 530.0 eV and a range of 530.0 to 531.0 eV.

The peak for $O\text{-}M^{3+}$ binding of an oxide having a $Li_wNi_{1-(x+y+z)}Co_xAl_yW_zO_2$ composition is shown in a range of 528.0 to 529.0 eV. While the peak for $O^{2-}$ of an oxide having a $Li_aNi_bW_cO_d$ composition is present in a range of 530.0 to 531.0 eV, the peak for $O^{2-}$ of oxides having $Li_aW_cO_d$ and $W_cO_d$ compositions are also shown in a range of 530.0 to 531.0 eV, and therefore it may be difficult to distinguish these oxides.

In XPS analysis, the lithium composite oxide included in the positive electrode active material according to an exemplary embodiment of the present invention may have both of a peak corresponding to $O\text{-}M^{3+}$ binding of an oxide having a $Li_wNi_{1(x+y+z)}Co_xAl_yW_zO_2$ composition and a peak of $O^{2-}$ of an oxide having a $Li_aNi_bW_cO_d$ composition. The peak shown in a range of 530.0 to 531.0 eV may be caused by an alloy oxide to be described below.

As described above, the positive electrode active material(s) including the solid solutions(s) represented by Formula 3 and/or Formula 3-1 may be improved in lifespan characteristics, efficiency characteristics and electrochemical characteristics such as resistance, compared to a conventional positive electrode active material, by improving lithium ion conductivity in the active material, particularly, at the surface of the active material.

In addition, in another exemplary embodiment, the positive electrode active material may include a coating layer covering at least a part of the primary particle and/or a secondary particle formed by aggregating the primary particles.

For example, the coating layer may be present to cover at least a part of an exposed surface of the core-shell particle, which is the primary particle. Particularly, the coating layer may be present to cover at least a part of an exposed surface of the core-shell particle, which is the primary particle, present at the outermost region of the secondary particle.

The coating layer present as described above may contribute to improvement in physical and electrochemical characteristics of the positive electrode active material.

Here, in the core-shell particle, which is the primary particle, present at the outermost region of the secondary particle, when the shell layer covers a part of the surface of the core, the coating layer may cover at least a part of the surface of the core which is not covered by the shell layer, or may be present to cover at least a part of the shell layer.

In addition, the coating layer may be defined as a region in which an alloy oxide represented by Formula 4 below is present.

$$\text{Li}_e\text{M5}_f\text{O}_g \qquad \text{[Formula 4]}$$

(Here,

M5 is at least one selected from Mn, Al, Ti, Zr, Mg, V, B, Mo, Zn, Nb, Ba, Ca, Ta, Fe, Cr, Sn, Hf, Ce, W, Nd and Gd, $0 \le e \le 6$, $0 < f \le 6$, and $0 < g \le 10$)

The alloy oxide may be physically and/or chemically linked to the first composite oxide. In addition, the alloy oxide may be physically and/or chemically linked to the second composite oxide. In addition, the alloy oxide may be physically and/or chemically linked to a solid solution formed of the first composite oxide and the second composite oxide.

As described above, as the positive electrode active material according to the exemplary embodiment includes the above-described alloy oxide, the structural stability may increase, and when the positive electrode active material is used in a lithium secondary battery, the high-temperature storage stability and lifespan characteristics of the positive electrode active material may be improved. In addition, the alloy oxide may serve as a diffusion path for lithium ions in the positive electrode active material, and thus affect the improvement of the efficiency characteristics of the lithium secondary battery.

In addition, in some cases, the alloy oxide may be present on at least a part of the interface between the core-shell particles and the surface of the secondary particle, and even in the inner pore formed in the secondary particle.

As shown in Formula 4, the alloy oxide is an oxide in which lithium is complexed with a metal element represented by M5, and may be, for example, Li(W)O, Li(Zr)O, Li(Ti)O, Li(B)O, $\text{WO}_x$, $\text{ZrO}_x$, or $\text{TiO}_x$. However, although the above examples are merely provided for convenience of understanding, the alloy oxide defined in the present invention is not limited to the above examples. Therefore, in experimental examples to be described below, for convenience, experimental results for some examples of a representative alloy oxide that can be represented by Formula 4 will be described.

In another exemplary embodiment, the alloy oxide may be an oxide prepared by complexing lithium and at least two metal elements represented by M5, or may further include an oxide prepared by complexing lithium and at least two metal elements represented by M5. The alloy oxide prepared by complexing lithium and at least two metal elements represented by M5 may be, for example, Li(W/Ti)O, Li(W/Zr)O, Li(W/Ti/Zr)O or Li(W/Ti/B)O, but the present invention is not necessarily limited thereto.

In addition, in this case, the lithium tungsten oxide may have a lattice structure that is doped with at least one type of metal element. That is, the alloy oxide may have a lattice structure formed of a lithium tungsten oxide (e.g., $\text{Li}_2\text{WO}_4$, $\text{Li}_2\text{W}_2\text{O}_7$, $\text{Li}_4\text{WO}_5$, $\text{Li}_6\text{WO}_6$ or $\text{Li}_6\text{W}_2\text{O}_9$), in which a part of the tungsten is substituted with a metal element. Here, as a metal element substituting for tungsten in the lattice structure, at least one selected from Mn, Al, Ti, Zr, Mg, V, B, Mo, Zn, Nb, Ba, Ca, Ta, Fe, Cr, Sn, Hf, Ce, Nd and Gd may be used.

In one exemplary embodiment, the alloy oxide may have a concentration gradient which decreases from the surface toward the center of the secondary particle. Accordingly, the concentration of the alloy oxide may be reduced from the outermost surface toward the center of the secondary particle.

As described above, as the alloy oxide has a concentration gradient which decreases from the surface toward the center of the secondary particle, residual lithium present at the surface of the positive electrode active material is effectively reduced, thereby preventing a side reaction by the unreacted residual lithium beforehand, and also preventing crystallinity in the inside of the surface of the positive electrode active material from being lowered by the alloy oxide. In addition, the collapse of the entire structure of the positive electrode active material during an electrochemical reaction may be prevented by the alloy oxide.

In another exemplary embodiment, the alloy oxide may include a first alloy oxide represented by Formula 5 below and a second alloy oxide represented by Formula 6 below.

$$\text{Li}_h\text{W}_i\text{O}_j \qquad \text{[Formula 5]}$$

(Here, $0 \le i \le 6$, $0 < j \le 6$ and $0 < k \le 10$)

$$\text{Li}_k\text{M6}_l\text{O}_m \qquad \text{[Formula 6]}$$

(Here,

M6 is at least one selected from Ti, Zr, Mg, V, B, Mo, Zn, Nb, Ba, Ca, Ta, Fe, Cr, Sn, Hf, Ce, Nd and Gd, $0 \le k \le 6$, $0 \le l \le 6$, and $0 < m \le 10$)

Here, the first alloy oxide and the second alloy oxide may have a concentration gradient which decreases from the surface toward the center of the secondary particle. Accordingly, the concentrations of the first alloy oxide and the second alloy oxide may decrease from the outermost surface toward the center of the secondary particle.

Here, it is preferable that the decrease rate of the second alloy oxide be higher than that of the first alloy oxide, and as the decrease rate of the second alloy oxide is higher than that of the first alloy oxide, the structural stability of the positive electrode active material including an alloy oxide may be maintained. In addition, it can positively improve the efficiency characteristics of a lithium secondary battery by forming an efficient diffusion path for lithium ions in the positive electrode active material.

In addition, the alloy oxide may include a third alloy oxide represented by Formula 7 below.

$$\text{Li}_n\text{W}_{l-o}\text{M7}_o\text{O}_p \qquad \text{[Formula 7]}$$

(Here,

M7 is at least one selected from Ti, Zr, Mg, V, B, Mo, Zn, Nb, Ba, Ta, Fe, Cr, Sn, Hf, Ce, Nd and Gd, $0 \le n \le 6$, $0 \le o \le 0.50$, and $0 < p \le 6$)

Here, the third alloy oxide may have a lattice structure in which a part of the tungsten therein is substituted with M7.

As described above, a positive electrode including a positive electrode active material according to one of various exemplary embodiments of the present invention may further improve high-temperature storage stability and lifespan characteristics when used as a positive electrode of a lithium secondary battery.

Lithium Secondary Battery

According to still another aspect of the present invention, a positive electrode including a positive electrode current collector and a positive electrode active material layer formed on the positive electrode current collector may be provided. Here, the positive electrode active material layer may include a positive electrode active material according to any one of various exemplary embodiments of the present invention. Therefore, since the positive electrode active material is the same as described above, for convenience, detailed description will be omitted, and hereinafter, other components that have not been described will be described.

The positive electrode current collector is not particularly limited as long as it does not cause a chemical change in a battery and has conductivity, and for example, stainless steel, aluminum, nickel, titanium, calcined carbon, or aluminum or stainless steel whose surface is treated with carbon, nickel, titanium or silver may be used. In addition, the positive electrode current collector may conventionally have a thickness of 3 to 500 μm, and fine irregularities may be formed on the surface of the positive electrode current collector, thereby increasing the adhesive strength of a positive electrode active material. For example, the positive electrode current collector may be used in various forms such as a film, a sheet, a foil, a net, a porous body, foam, a non-woven fabric, etc.

The positive electrode active material layer may include a conductive material as well as the positive electrode active material, and selectively a binder when needed.

Here, the positive electrode active material may be included at 80 to 99 wt %, and specifically, 85 to 98.5 wt % with respect to the total weight of the positive electrode active material layer. When the positive electrode active material is included in the above content range, excellent capacity characteristics may be exhibited, but the present invention is not limited thereto.

The conductive material is used to impart conductivity to an electrode, and is not particularly limited as long as it has electron conductivity without causing a chemical change in a battery. A specific example of the conductive material may be graphite such as natural graphite or artificial graphite; a carbon-based material such as carbon black, acetylene black, Ketjen black, channel black, furnace black, lamp black, thermal black or a carbon fiber; a metal powder or metal fiber consisting of copper, nickel, aluminum, or silver; a conductive whisker consisting of zinc oxide or potassium titanate; a conductive metal oxide such as titanium oxide; or a conductive polymer such as a polyphenylene derivative, and one or a mixture of two or more thereof may be used. The conductive material may be included at 0.1 to 15 wt % with respect to the total weight of the positive electrode active material layer.

The binder serves to improve attachment between particles of the positive electrode active material and the adhesive strength between the positive electrode active material and a current collector. A specific example of the binder may be polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber (SBR), fluorine rubber, or various copolymers thereof, and one or a mixture of two or more thereof may be used. The binder may be included at 0.1 to 15 wt % with respect to the total weight of the positive electrode active material layer.

The positive electrode may be manufactured according to a conventional method of manufacturing a positive electrode, except that the above-described positive electrode active material is used. Specifically, the positive electrode may be manufactured by applying a composition for forming a positive electrode active material layer prepared by dissolving or dispersing the positive electrode active material, and selectively, a binder and a conductive material in a solvent on a positive electrode current collector, and drying and rolling the resulting product.

The solvent may be a solvent generally used in the art, and may be dimethyl sulfoxide (DMSO), isopropyl alcohol, N-methylpyrrolidone (NMP), acetone or water, and one or a mixture of two or more thereof may be used. In consideration of the coating thickness and production yield of a slurry, the solvent is used at a sufficient amount for dissolving or dispersing the positive electrode active material, the conductive material and the binder, and then having a viscosity that can exhibit an excellent thickness uniformity when applied to prepare a positive electrode.

In addition, in another exemplary embodiment, the positive electrode may be prepared by casting the composition for forming a positive electrode active material layer on a separate support, and laminating a film obtained by delamination from the support on a positive electrode current collector.

Moreover, according to still another aspect of the present invention, an electrochemical device including the above-described positive electrode may be provided. The electrochemical device may be, specifically, a battery, a capacitor, and more specifically, a lithium secondary battery.

The lithium secondary battery may specifically include a positive electrode, a negative electrode disposed opposite to the positive electrode, and a separator and an electrolyte, which are interposed between the positive electrode and the negative electrode. Here, since the positive electrode is the same as described above, for convenience, detailed description for the positive electrode will be omitted, and other components which have not been described below will be described in detail.

The lithium secondary battery may further include a battery case accommodating an electrode assembly of the positive electrode, the negative electrode and the separator, and selectively, a sealing member for sealing the battery case.

The negative electrode may include a negative electrode current collector and a negative electrode active material layer disposed on the negative electrode current collector.

The negative electrode current collector is not particularly limited as long as it has high conductivity without causing a chemical change in a battery, and may be, for example, copper, stainless steel, aluminum, nickel, titanium, calcined carbon, or copper or stainless steel whose surface is treated with carbon, nickel, titanium or silver, or an aluminum-cadmium alloy. In addition, the negative electrode current collector may generally have a thickness of 3 to 500 μm, and like the positive electrode current collector, fine irregularities may be formed on the current collector surface, thereby enhancing the binding strength of the negative electrode active material. For example, the negative electrode current collector may be used in various forms such as a film, a sheet, a foil, a net, a porous body, foam, a non-woven fabric, etc.

The negative electrode active material layer selectively includes a binder and a conductive material, as well as the negative electrode active material.

As the negative electrode active material, a compound enabling the reversible intercalation and deintercalation of lithium may be used. A specific example of the negative electrode active material may be a carbonaceous material such as artificial graphite, natural graphite, graphitized carbon fiber or amorphous carbon; a metallic compound capable of alloying with lithium, such as Si, Al, Sn, Pb, Zn, Bi, In, Mg, Ga, Cd, a Si alloy, a Sn alloy or an Al alloy; a metal oxide capable of doping and dedoping lithium such as $SiO_\beta$ ($0<\beta<2$), $SnO_2$, vanadium oxide, or lithium vanadium oxide; or a composite including the metallic compound and the carbonaceous material such as a Si—C composite or a Sn—C composite, and any one or a mixture of two or more thereof may be used. In addition, as the negative electrode active material, a metal lithium thin film may be used. In addition, as a carbon material, both low-crystalline carbon and high-crystalline carbon may be used. Representative examples of the low-crystalline carbon include soft carbon and hard carbon, and representative examples of the high-crystalline carbon include amorphous, sheet-type, flake-type, spherical or fiber-type natural or artificial graphite, Kish graphite, pyrolytic carbon, mesophase pitch-based carbon fiber, meso-carbon microbeads, mesophase pitches, and high-temperature calcined carbon such as petroleum or coal tar pitch derived cokes.

The negative electrode active material may be included at 80 to 99 wt % with respect to the total weight of the negative electrode active material layer.

The binder is a component aiding bonding between a conductive material, an active material and a current collector, and may be generally added at 0.1 to 10 wt % with respect to the total weight of the negative electrode active material layer. Examples of the binder may include polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber, nitrile-butadiene rubber, fluorine rubber, and various copolymers thereof.

The conductive material is a component for further improving conductivity of the negative electrode active material, and may be added at 10 wt % or less, and preferably, 5 wt % or less with respect to the total weight of the negative electrode active material layer. The conductive material is not particularly limited as long as it does not cause a chemical change in the battery, and has conductivity, and may be, for example, graphite such as natural graphite or artificial graphite; carbon black such as acetylene black, Ketjen black, channel black, furnace black, lamp black or thermal black; a conductive fiber such as a carbon fiber or a metal fiber; a metal powder such as fluorinated carbon, aluminum, or nickel powder; a conductive whisker such as zinc oxide or potassium titanate; a conductive metal oxide such as titanium oxide; or a conductive material such as a polyphenylene derivative.

In an exemplary embodiment, the negative electrode active material layer maybe prepared by applying a composition for forming the negative electrode active material layer, which is prepared by dissolving or dispersing a negative electrode active material, and selectively a binder and a conductive material in a solvent, on the negative electrode current collector, and drying the resulting product, or may be prepared by casting a composition for forming the negative electrode active material layer on a separate support and laminating a film obtained by delamination from the support on the negative electrode current collector.

Meanwhile, in the lithium secondary battery, a separator is not particularly limited as long as it is generally used in a lithium secondary battery to separate a negative electrode from a positive electrode and provide a diffusion path for lithium ions, and particularly, the separator has a low resistance to ion mobility of an electrolyte and an excellent electrolyte solution impregnation ability. Specifically, a porous polymer film, for example, a porous polymer film prepared of a polyolefin-based polymer such as an ethylene homopolymer, a propylene homopolymer, an ethylene/butene copolymer, an ethylene/hexene copolymer and an ethylene/methacrylate copolymer, or a stacked structure including two or more layers thereof may be used. In addition, a conventional porous non-woven fabric, for example, a non-woven fabric formed of a high melting point glass fiber or a polyethylene terephthalate fiber may be used. In addition, a coated separator including a ceramic component or a polymer material may be used to ensure thermal resistance or mechanical strength, and may be selectively used in a single- or multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, or a molten-type inorganic electrolyte, which can be used in production of a lithium secondary battery, but the present invention is not limited thereto.

Specifically, the electrolyte may include an organic solvent and a lithium salt.

The organic solvent is not particularly limited as long as it can serve as a medium enabling the transfer of ions involved in an electrochemical reaction of a battery. Specifically, the organic solvent may be an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; a nitrile-based solvent such as R—CN (R is a linear, branched or cyclic C2 to C20 hydrocarbon group, and may include a double bonded aromatic ring or an ether bond); an amide-based solvent such as dimethylformamide; a dioxolane-based solvent such as 1,3-dioxolane; or a sulfolane-based solvent. Among these, a carbonate-based solvent is preferably used, and a mixture of a cyclic carbonate (for example, ethylene carbonate or propylene carbonate) having high ion conductivity and high permittivity to increase the charge/discharge performance of a battery and a low-viscosity linear carbonate-based compound (for example, ethyl methyl carbonate, dimethyl carbonate or diethyl carbonate) is more preferably used. In this case, by using a mixture of a cyclic carbonate and a chain-type carbonate in a volume ratio of approximately 1:1 to 1:9, the electrolyte solution may exhibit excellent performance.

The lithium salt is not particularly limited as long as it is a compound capable of providing a lithium ion used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$. The concentration of the lithium salt is preferably in the range of 0.1 to 2.0M. When the concentration of the lithium salt is included in the above-mentioned range, the electrolyte has suitable conductivity and viscosity and thus can exhibit excellent electrolytic performance. Therefore, lithium ions can effectively migrate.

To enhance lifespan characteristics of the battery, inhibit a decrease in battery capacity, and enhance discharge capacity of the battery, the electrolyte may further include one or more types of additives, for example, a haloalkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride, in addition to the components of the electrolyte. Here, the additive(s) may be included at 0.1 to 5 wt % with respect to the total weight of the electrolyte.

Since the lithium secondary battery including the positive electrode active material according to the present invention stably exhibits excellent discharge capacity, excellent output characteristics and lifespan characteristics, it is useful in portable devices such as a mobile phone, a notebook computer and a digital camera and an electric automobile field such as a hybrid electric vehicle (HEV).

The outer shape of the lithium secondary battery according to the present invention is not particularly limited, but may be a cylindrical, prismatic, pouch or coin type using a can. In addition, the lithium secondary battery may be used in a battery cell that is not only used as a power source of a small device, but also preferably used as a unit battery for a medium-to-large battery module including a plurality of battery cells.

According to yet another exemplary embodiment of the present invention, a battery module including the lithium secondary battery as a unit cell and/or a battery pack including the same may be provided.

The battery module or the battery pack may be used as a power source of any one or more medium-to-large devices including a power tool; an electric motor vehicle such as an electric vehicle (EV), a hybrid electric vehicle, and a plug-in hybrid electric vehicle (PHEV); and a power storage system.

Hereinafter, the present invention will be described in further detail with reference to examples. However, these examples are merely provided to explain the present invention, and it will not be interpreted that the scope of the present invention is limited by the examples below.

Experimental Example 1

(1) Preparation of Positive Electrode Active Material

Example 1

A spherical $Ni_{0.92}Co_{0.08}(OH)_2$ hydroxide precursor was synthesized by a co-precipitation method. In a 90 L reactor, 25 wt % NaOH and 30 wt % $NH_4OH$ were input into an aqueous 1.5M sulfuric acid solution of a transition metal complex in which $NiSO_4 \cdot 7H_2O$ and $CoSO_4 \cdot 7H_2O$ were mixed in a molar ratio of 92:8. The pH in the reactor was maintained at 11.5, the temperature of the reactor was maintained at 60° C., and an inert gas $N_2$ was added to the reactor to prevent the prepared precursor from being oxidized. After the completion of synthesis and stirring, washing and dehydration were performed using filter press (F/P) equipment, thereby obtaining a $Ni_{0.92}Co_{0.08}(OH)_2$ hydroxide precursor.

The hydroxide precursor was mixed with LiOH as a Li-containing raw material and $Al_2O_3$ as an Al-containing raw material using a mixer, a calcination furnace was heated at a rate of 1° C. per minute while maintaining a $O_2$ atmosphere, and maintained at a thermal treatment temperature of 650 □ for 10 hours, followed by natural cooling. The obtained positive electrode active material was mixed with a W-containing raw material ($WO_3$) using a mixer. In the same calcination furnace, the temperature was increased 2 □ per minute while maintaining the $O_2$ atmosphere, and the furnace was maintained at a thermal treatment temperature of 600 □ for 5 hours, followed by natural cooling. Subsequently, each of thermal treatment and cooling were carried out once under the same conditions as above. The positive electrode active material prepared in Example 1 was confirmed to have composition formula $Li_{1.0}Ni_{0.902}Co_{0.079}Al_{0.014}W_{0.005}O_2$.

Example 2

A positive electrode active material was prepared by the same method as described in Example 1, except that a W-containing raw material ($WO_3$) and a cobalt source material ($Co(OH)_2$) were mixed such that the composition formula of the positive electrode active material obtained in Example 2 was $Li_{1.04}Ni_{0.897}Co_{0.084}Al_{0.014}W_{0.005}O_2$.

Example 3

A positive electrode active material was prepared by the same method as described in Example 1, except that a W-containing raw material ($WO_3$) and a magnesium source material ($Mg(OH)_2$) were mixed such that the composition formula of the positive electrode active material obtained in Example 3 was $Li_{1.04}Ni_{0.897}Co_{0.079}Al_{0.014}W_{0.005}Mg_{0.005}O_2$.

Example 4

A positive electrode active material was prepared by the same method as described in Example 1, except that a W-containing raw material ($WO_3$) and a manganese source material ($Mn(OH)_2$) were mixed such that the composition formula of the positive electrode active material obtained in Example 4 was $Li_{1.04}Ni_{0.897}Co_{0.079}Al_{0.014}W_{0.005}Mn_{0.005}O_2$.

Example 5

A positive electrode active material was prepared by the same method as described in Example 1, except that a W-containing raw material ($WO_3$) and a titanium source material ($TiO_2$) were mixed such that the composition formula of the positive electrode active material obtained in Example 5 was $Li_{1.04}Ni_{0.901}Co_{0.79}Al_{0.014}W_{0.005}Ti_{0.001}O_2$.

Example 6

A positive electrode active material was prepared by the same method as described in Example 1, except that a W-containing raw material ($WO_3$) and a zirconium source material ($ZrO_2$) were mixed such that the composition formula of the positive electrode active material obtained in Example 6 was $Li_{1.04}Ni_{0.904}Co_{0.079}Al_{0.014}W_{0.005}Zr_{0.001}O_2$.

Example 7

A positive electrode active material was prepared by the same method as described in Example 1, except that a W-containing raw material ($WO_3$), a Ti-containing source material ($TiO_2$) and a zirconium-containing material were mixed such that the composition formula of the positive electrode active material obtained in Example 7 was $Li_{1.04}Ni_{0.901}Co_{0.078}Al_{0.014}W_{0.005}Ti_{0.001}Zr_{0.001}O_2$.

Comparative Example 1

A positive electrode active material was prepared by the same method as described in Example 1, except that a W-containing source material ($WO_3$) was not mixed such that the composition formula of the positive electrode active material prepared in Comparative Example 1 was $Li_{1.04}Ni_{0.907}Co_{0.079}Al_{0.014}O_2$.

Comparative Example 2

$Li_4NiWO_6$ was synthesized using a solid phase synthesis method. The lithium composite oxide $Li_4NiWO_6$ was prepared by mixing $Ni(OH)_2$, $WO_3$ and $LiOH$—$H_2O$ with a mixer, and thermally treating the resulting mixture at 1000 □. A positive electrode active material was prepared by mixing 0.5 mol % of $Li_4NiWO_6$ with the positive electrode active material prepared in Comparative Example 1.

Comparative Example 3

A positive electrode active material was prepared by the same method as described in Example 1, except that the positive electrode active material $Li_{1.04}Ni_{0.97}Co_{0.079}Al_{0.014}O_2$ prepared in Comparative Example 1 was mixed with 0.5 mol % each of $Li_2WO_4$ and $Li_2W_2O_7$ synthesized by a solid phase synthesis method, but not thermally treated.

Comparative Example 4

A positive electrode active material was prepared by the same method as described in Example 1, except that the positive electrode active material $Li_{1.04}Ni_{0.97}Co_{0.079}Al_{0.014}O_2$ prepared in Comparative Example 1 was mixed with 0.5 mol % of $Li_4NiWO_6$ synthesized by a solid phase synthesis method, but not thermally treated.

(2) XPS Analysis of Positive Electrode Active Material

XPS analysis was performed on the positive electrode active materials prepared according to the Examples and Comparative Examples to verify whether a solid solution is present in the positive electrode active material. The XPS analysis was performed using Quantum 2000 (Physical Electronics. Inc.) (Acceleration voltage: 0.5 to 15 keV, 300 W, Energy resolution: approximately 1.0 eV, Minimum analysis area: 10 micro, Sputter rate: 0.1 nm/min).

Figure 2:
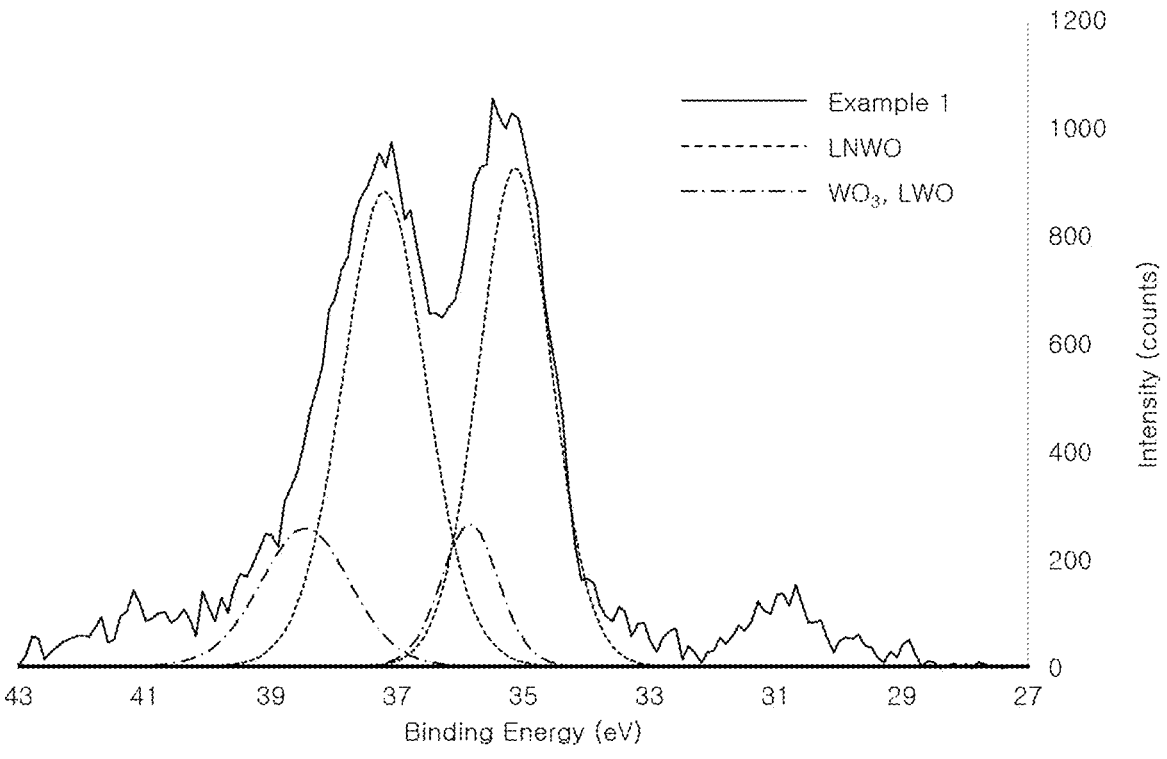
FIG. 2 shows the result of XRS analysis for a positive electrode active material prepared according to an exemplary embodiment of the present invention.

FIG. 2 is a graph showing the result of the XPS analysis for the positive electrode active material prepared according to Example 1.

Referring to FIG. 2, it can be confirmed that the $W4f_{7/2}$ peak for $O^{2-}$ of an oxide having a $Li_aNi_bW_cO_d$ composition is present in a range of 34.0 to 35.0 eV, and the $W4f_{5/2}$ peak is present in the range of 36.0 to 37.0 eV. On the other hand, it can be confirmed that the $W4f_{7/2}$ peak for $W^{6+}$ of an oxide having a $Li_aW_cO_d$ or $W_cO_d$ composition is present in a range exceeding 35.5 eV, and the $W4f_{5/2}$ peak is present in a range exceeding 37.5 eV.

In the case of the W4f spectrum of the positive electrode active material prepared according to Example 1, it can be confirmed that the $W4f_{7/2}$ peak is present in the range from 34.0 to 35.5 eV, and the $W4f_{5/2}$ peak is present in the range from 36.0 to 37.5 eV. That is, the positive electrode active material prepared according to Example 1 exhibits a unique peak of $Li_aNi_bW_cO_d$.

Accordingly, as shown in FIG. 2, by confirming the presence of the unique peak corresponding to $Li_aNi_bW_cO_d$ from the W4f results of the positive electrode active materials having NCA compositions, it can be seen that the positive electrode active material prepared according to Example 1 includes a composite formed of an oxide having a $Li_aNi_bW_cO_d$ composition and an oxide having a $Li_wNi_{1-(x+y+z)}Co_xAl_yW_zO_2$ composition in a solid solution.

Table 2 below shows the binding energy sections in which respective peaks corresponding to $W4f_{7/2}$ and $W4f_{5/2}$ of the positive electrode active materials prepared according to the Examples and Comparative Examples were present.

TABLE 1

| | | W content in positive electrode active material | Dopant content in solid solution (mol %) | | | Dopant content in alloy oxide (mol %) | |
|---|---|---|---|---|---|---|---|
| | Composition | (mol %) | Co | Mg | Mn | Ti | Zr |
| Example 1 | $Li_{1.04}Ni_{0.902}Co_{0.079}Al_{0.014}W_{0.005}O_2$ | 0.5 | — | — | — | — | — |
| Example 2 | $Li_{1.03}Ni_{0.897}Co_{0.084}Al_{0.014}W_{0.005}O_2$ | 0.5 | 0.5 | — | — | — | — |
| Example 3 | $Li_{1.03}Ni_{0.897}Co_{0.079}Al_{0.014}W_{0.005}Mg_{0.005}O_2$ | 0.5 | — | 0.5 | — | — | — |
| Example 4 | $Li_{1.03}Ni_{0.897}Co_{0.079}Al_{0.014}W_{0.005}Mn_{0.005}O_2$ | 0.5 | — | — | 0.5 | — | — |
| Example 5 | $Li_{1.03}Ni_{0.901}Co_{0.079}Al_{0.014}W_{0.005}Ti_{0.001}O_2$ | 0.5 | — | — | — | 0.1 | — |
| Example 6 | $Li_{1.03}Ni_{0.901}Co_{0.079}Al_{0.014}W_{0.005}Zr_{0.001}O_2$ | 0.5 | — | — | — | — | 0.1 |
| Example 7 | $Li_{1.03}Ni_{0.901}Co_{0.078}Al_{0.014}W_{0.005}Ti_{0.001}Zr_{0.001}O_2$ | 0.5 | — | — | — | 0.1 | 0.1 |
| Comparative Example 1 | $Li_{1.03}Ni_{0.907}Co_{0.079}Al_{0.0145}O_2$ | — | — | — | — | — | — |
| Comparative Example 2 | $Li_{1.03}Ni_{0.907}Co_{0.079}Al_{0.0145}O_2 + WO_3$ | 0.5 | — | — | — | — | — |
| Comparative Example 3 | $Li_{1.03}Ni_{0.907}Co_{0.079}Al_{0.0145}O_2 + Li_2WO_4/Li_2W_2O_7$ | 0.5 | | | | | |
| Comparative Example 4 | $Li_{1.03}Ni_{0.907}Co_{0.079}Al_{0.0145}O_2 + Li_4NiWO_6$ | 0.5 | | | | | |

TABLE 2

| | Classification | | | |
|---|---|---|---|---|
| | $W4f_{7/2}$ (eV) | | $W4f_{5/2}$ (eV) | |
| | Range | | | |
| | 34.0~ 35.0 eV | 35.0~ 36.0 eV | 36.0~ 37.0 eV | 37.0~ 38.0 eV |
| Example 1 | ○ | ○ | ○ | ○ |
| Example 2 | ○ | ○ | ○ | ○ |
| Example 3 | ○ | ○ | ○ | ○ |
| Example 4 | ○ | ○ | ○ | ○ |
| Example 5 | ○ | ○ | ○ | ○ |
| Example 6 | ○ | ○ | ○ | ○ |
| Example 7 | ○ | ○ | ○ | ○ |
| Comparative Example 1 | X | X | X | X |
| Comparative Example 2 | X | ○ | X | ○ |
| Comparative Example 3 | X | ○ | X | ○ |
| Comparative Example 4 | ○ | X | ○ | X |

Referring to the results of Table 2, in the cases of Examples 1 to 7, compared to Comparative Example 4, it can be confirmed that, although an oxide having a $Li_aN-i_bW_cO_d$ composition is not separately added, a W4f peak corresponding to an oxide having a $Li_aNi_bW_cO_d$ composition is observed.

(3) XRD Analysis for Positive Electrode Active Material

XRD analysis for positive electrode active materials prepared according to the Examples and Comparative Examples was performed to verify whether $Li_wNi_{1-(x+y+z)}Co_xAl_yW_zO_2$ and $Li_aNi_bW_cO_d$ phases are present in a positive electrode active material. The XRD analysis was performed using a Bruker D8 Advance diffractometer with Cu Kα radiation (1.540598 □).

Figure 3:
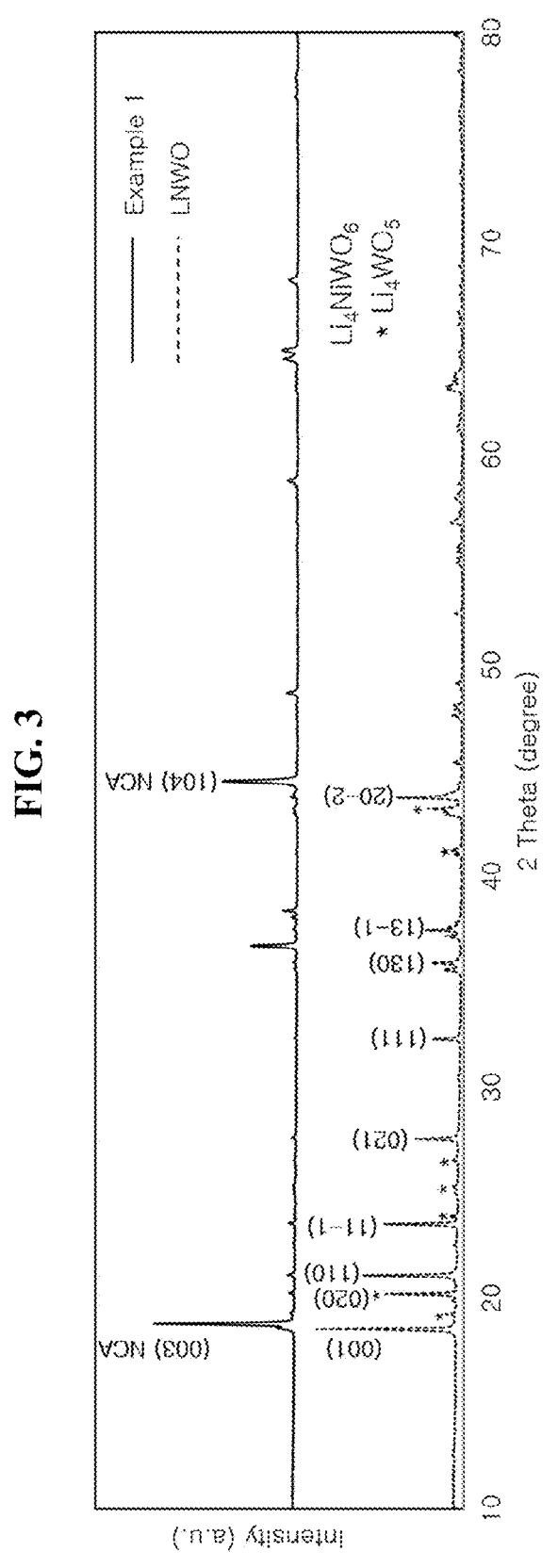
Figure 4:
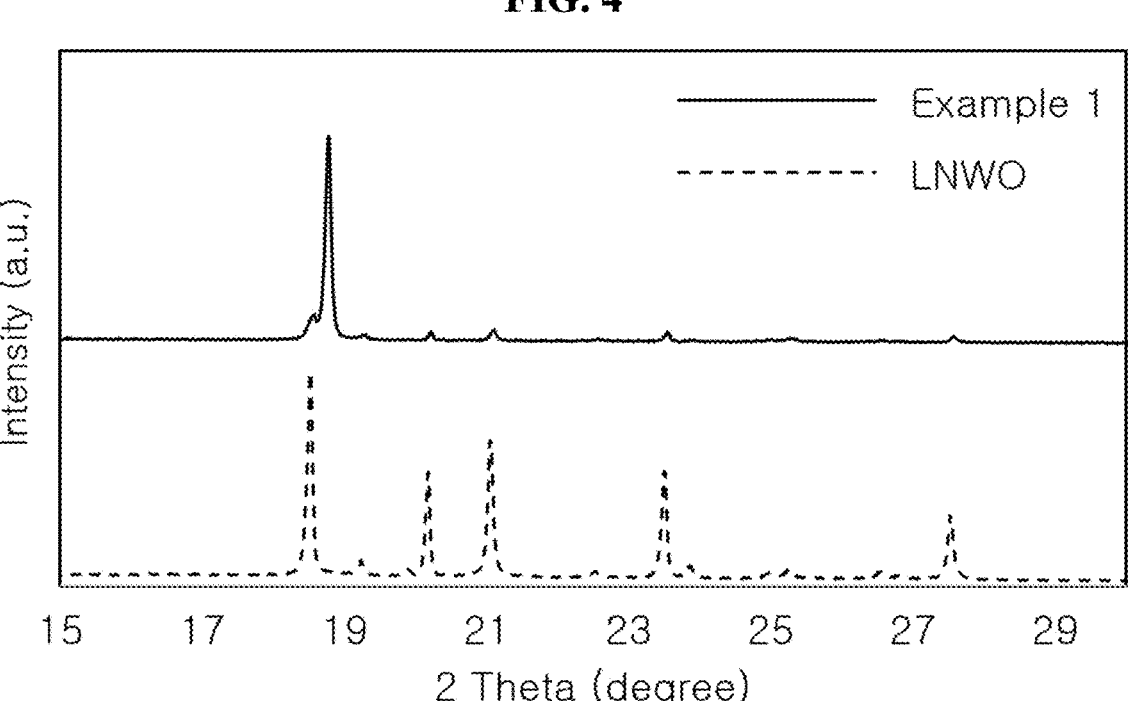
Figure 5:
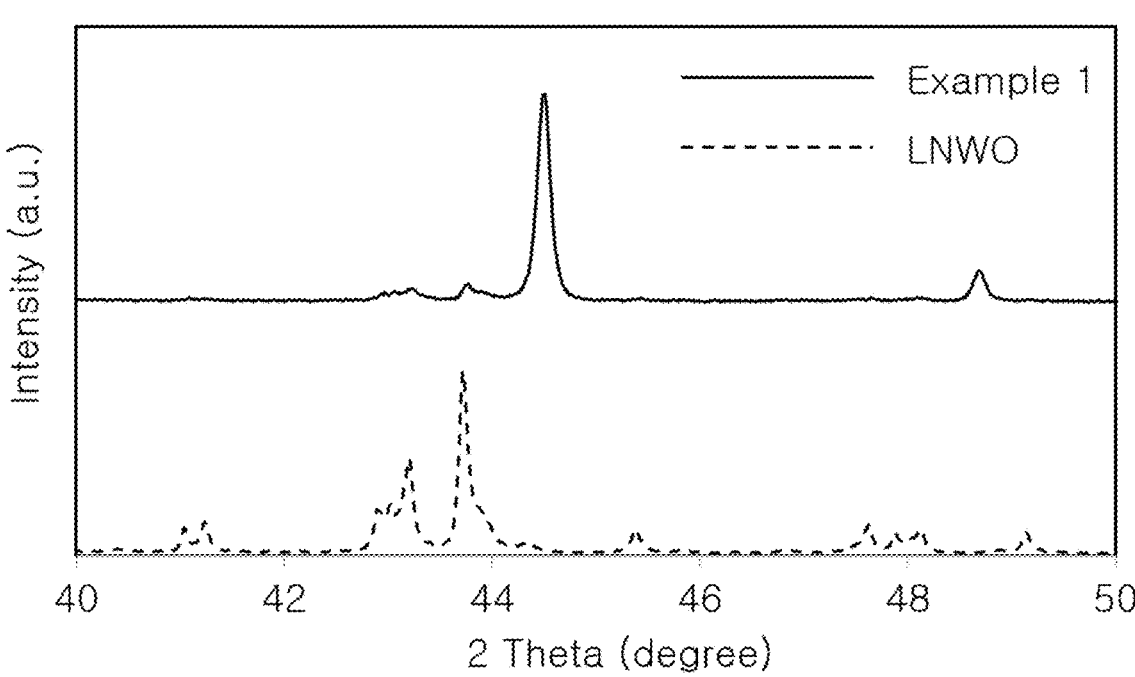

FIGS. 3 to 5 are graphs showing the XRD analysis results for the positive electrode active material prepared according to Example 1.

Referring to FIG. 3, it can be confirmed that a compound included in a positive electrode active material exhibits both of a diffraction peak characteristic specific for $Li_aNi_bW_cO_d$ and a diffraction peak characteristic specific for $Li_wNi_{1-(x+y+z)}Co_xAl_yW_zO_2$.

More specifically, referring to FIGS. 4 and 5, it can be confirmed that there is a diffraction peak corresponding to the (003) crystal face of $Li_wNi_{1-(x+y+z)}Co_xAl_yW_zO_2$ at 2θ of approximately 18.8°. In addition, it can be confirmed that there is a diffraction peak corresponding to the (001) crystal face of $Li_4NiWO_6$ at 2θ of approximately 18.3°. That is, a compound included in a positive electrode active material exhibits both of a diffraction peak characteristic specific for $Li_aNi_bW_cO_d$ and a diffraction peak characteristic specific for $Li_wNi_{1-(x+y+z)}Co_xAl_yW_zO_2$ at 2θ of 18° to 20°.

In a region included in the positive electrode active material, in which 2θ is 20° to 30°, specific diffraction peaks are shown at positions of the (020) crystal face, the (110) crystal face, the (11-1) crystal face and the (021) crystal face, indicating diffraction peaks corresponding to $Li_aNi_bW_cO_d$.

In addition, referring to FIGS. 3 and 5, it can be confirmed that a compound included in a positive electrode active material exhibits a diffraction peak corresponding to the (104) crystal face of $Li_wNi_{1-(x+y+z)}Co_xAl_yW_zO_2$ at 2θ of approximately 44.5°, and a diffraction peak corresponding to the (20-2) crystal face of $Li_4NiWO_6$ at 2θ of approximately 43.2°.

Therefore, putting the results of FIGS. 3 to 6 together, it can be confirmed that a compound included in a positive electrode active material exhibits a diffraction peak characteristic specific for $Li_aNi_bW_cO_d$ and a diffraction peak characteristic specific for $Li_wNi_{1-(x+y+z)}Co_xAl_yW_zO_2$, indicating a solid solution represented by Formula $Li_aNi_bW_cO_d$—$Li_wNi_{1-(x+y+z)}Co_xAl_yW_zO_2$.

Moreover, while all of the positive electrode active materials prepared according to Examples 2 to 7 exhibit diffraction peak patterns specific for a solid solution and a lithium alloy oxide, in the case of the positive electrode active material prepared according Comparative Example 1, only a diffraction peak pattern corresponding to a $Li_wNi_{1-(x+y+z)}Co_xAl_yO_2$ composition was detected.

On the other hand, through the XRD analysis, in the cases of the positive electrode active materials prepared according to Comparative Example 2 and Comparative Example 3, no diffraction peak specific for $Li_aNi_bW_cO_d$ was shown, but in the case of the positive electrode active material prepared according to Comparative Example 4, a diffraction peak pattern similar to the positive electrode active material prepared according to Example 1 was shown.

In the case of the positive electrode active material prepared according to Comparative Example 4, since the oxide having a $Li_aNi_bW_cO_d$ composition and an oxide having a $Li_wNi_{1-(x+y+z)}Co_xAl_yW_zO_2$ composition are present while being simply mixed, diffraction peaks respectively resulting from $Li_aNi_bW_cO_d$ and $Li_wNi_{1-(x+y+z)}Co_xAl_yW_zO_2$ are simultaneously detected, but it does not mean that $Li_aNi_bW_cO_d$ and $Li_wNi_{1-(x+y+z)}Co_xAl_yW_zO_2$, which are components constituting the positive electrode active material prepared according to Comparative Example 4, form a solid solution.

Additionally, by performing XRD analysis for the positive electrode active materials prepared according to Examples 5 to 7, it was confirmed whether an alloy oxide is present in a positive electrode active material. The XRD analysis was performed using a Bruker D8 Advance diffractometer with CuKα radiation (1.540598 □).

Figure 6:
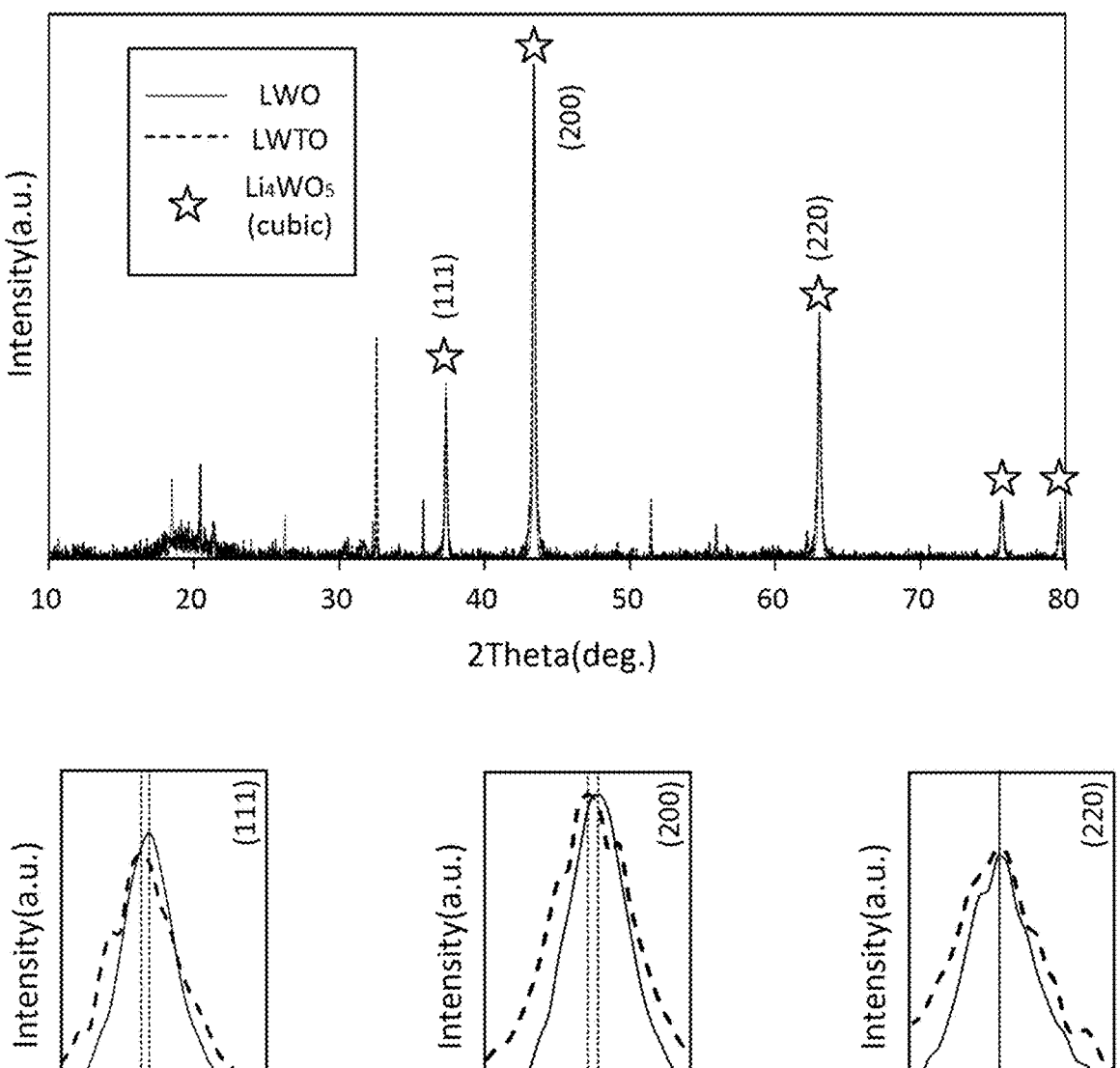
FIGS. 6 to 8 are graphs showing the results of XRD analysis for a positive electrode active material prepared according to another exemplary embodiment of the present invention.
Figure 7:
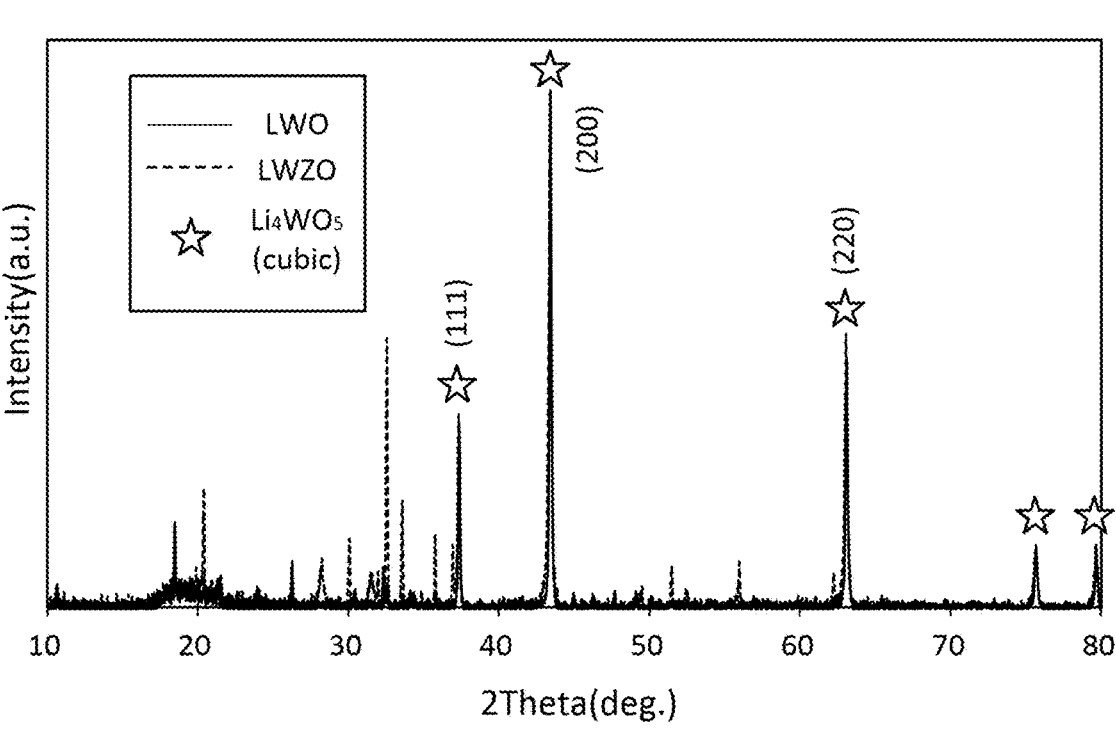
Figure 7:
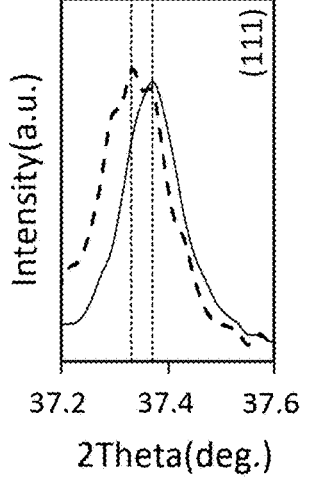
Figure 7:
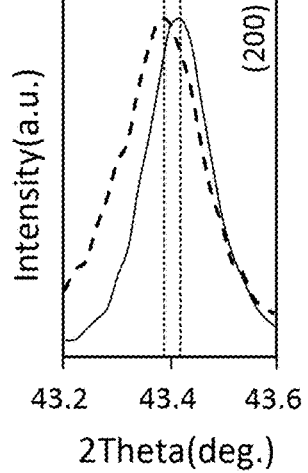
Figure 7:
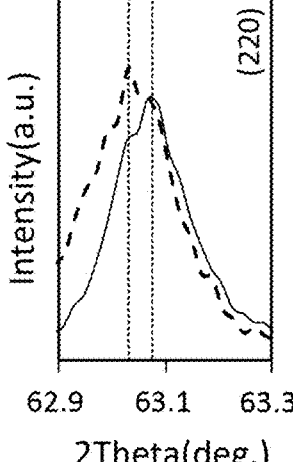
Figure 8:
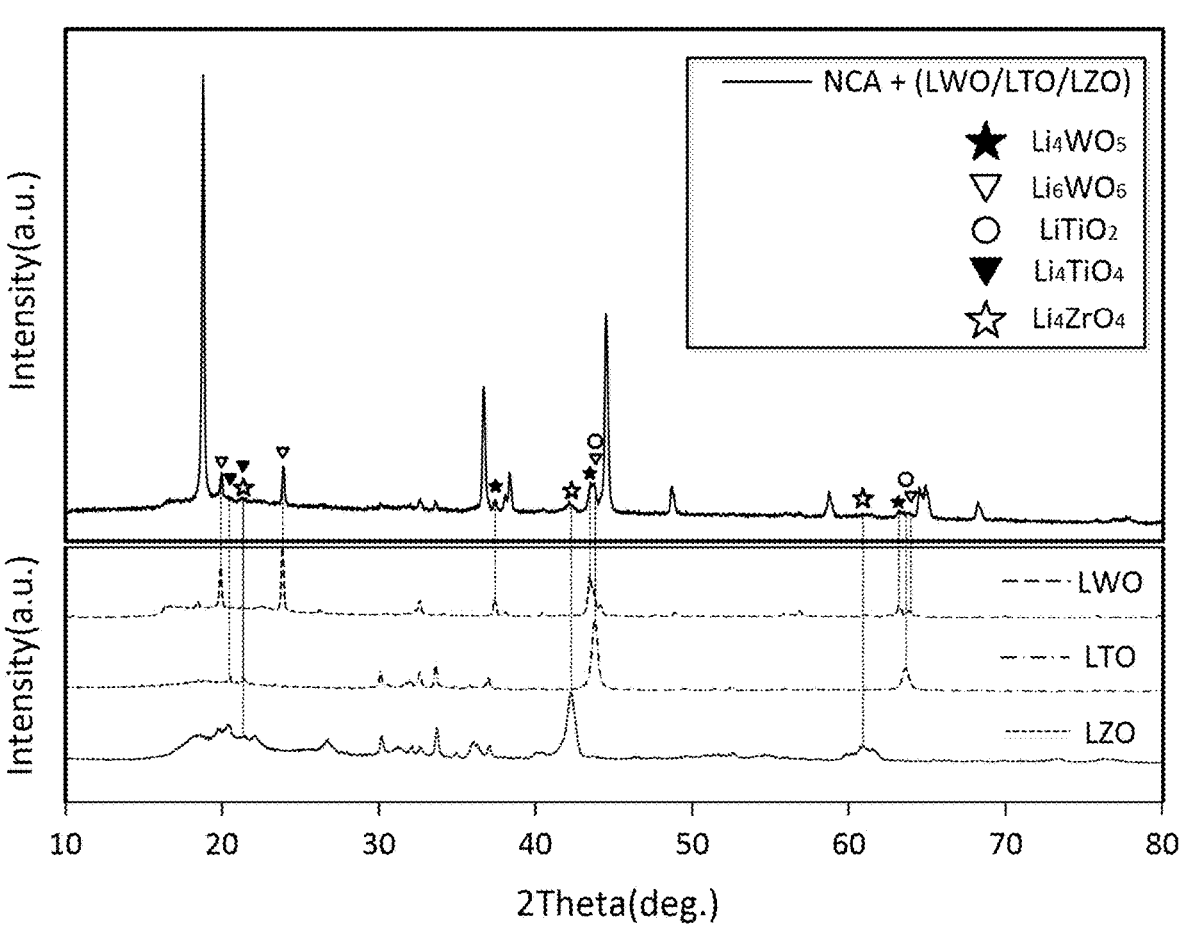

FIGS. 6 to 8 are graphs showing the results of XRD analysis for the positive electrode active materials prepared according to Examples 5 to 7.

Referring to FIG. 6, a specific peak corresponding to $Li_4WO_5$, which is an alloy oxide, in the positive electrode active material prepared according to Example 5 was confirmed, and particularly, while the (220) peak was not shifted, the (111) and (200) peaks were specifically shifted toward a low angle, and thus it was confirmed that there is a different type of alloy oxide in which a part of the tungsten in the lattice structure forming $Li_4WO_5$ is substituted with Ti.

In addition, referring to FIG. 7, a characteristic peak corresponding to an alloy oxide $Li_4WO_5$ of the positive electrode active material prepared according to Example 6 was confirmed, and particularly, as (111), (200) and (220) peaks are specifically shifted toward a low angle, it was confirmed that there are different types of alloy oxides in which a part of the tungsten in a lattice structure formed by $Li_4WO_5$ is substituted with Zr.

Referring to FIG. 8, it can be confirmed that the positive electrode active material prepared according to Example 7 has an NCA composition, and there are peaks corresponding to $Li_4WO_5$, $Li_6WO_6$, $LiTiO_2$, $Li_4TiO_4$ and $Li_4ZrO_4$ in the positive electrode active material.

(5) Measurement of Unreacted Lithium of Positive Electrode Active Material

The measurement of unreacted lithium in each of the positive electrode active materials prepared according to the Examples and Comparative Examples was performed with an amount of 0.1M HCl used until pH 4 by pH titration. First, 5 g of each positive electrode active material was added to 100 mL of DIW, stirred for 15 minutes, and then filtered. 0.1 M HCl was added to 50 mL of the filtered solution, and an amount of HCl consumption according to pH change was measured to determine Q1 and Q2, and thereby, unreacted LiOH and $Li_2CO_3$ were calculated.

M1=23.95 (LiOH Molecular weight)

M2=73.89 ($Li_2CO_3$ Molecular weight)

SPL Size=(Sample weight×Solution Weight)/Water Weight

LiOH(wt %)=[(Q1−Q2)×C×M1×100]/(SPL Size× 1000)

$Li_2CO_3$(wt %)=[2×Q2×C×M2/2×100]/(SPL Size× 1000)

The measurement results of unreacted lithium obtained by the above equations are shown in Table 3 below.

TABLE 3

| | Classification | |
| --- | --- | --- |
| | LiOH (ppm) | $Li_2CO_3$ (ppm) |
| Example 1 | 4,724 | 5,067 |
| Example 2 | 4,913 | 4,977 |
| Example 3 | 4,833 | 5,322 |
| Example 4 | 5,177 | 4,698 |
| Example 5 | 4,598 | 5,807 |
| Example 6 | 4,967 | 5,465 |
| Example 7 | 4,193 | 4,654 |
| Comparative Example 1 | 9,813 | 6,012 |
| Comparative Example 2 | 10,052 | 6,131 |
| Comparative Example 3 | 13,683 | 7,375 |
| Comparative Example 4 | 12,970 | 6,755 |

Referring to the results shown in Table 3, it can be confirmed that the positive electrode active materials prepared according to Examples 1 to 7, compared to those of Comparative Examples 1 to 4, have greatly reduced residual lithium amounts. Particularly, in the cases of each of Comparative Examples 2 to 4 in which the oxide having a $Li_aW_cO_d$, $W_cO_d$ or $Li_aNi_bW_cO_d$ composition and a composite oxide having a $Li_wNi_{1(x+y+z)}Co_xAl_yW_zO_2$ composition are simply mixed, it can be confirmed that, compared to the positive electrode active material having a simple $Li_wNi_{1-(x+y+z)}Co_xAl_yW_zO_2$ composition (Comparative Example 1), an amount of residual lithium is not sufficiently reduced.

Experimental Example 2

(1) Manufacture of Lithium Secondary Battery 94 wt % each of the positive electrode active materials prepared according to the Examples and Comparative Examples, 3 wt % carbon black and 3 wt % of a PVDF binder were dispersed in 30 g of N-methyl-2-pyrrolidone (NMP), thereby preparing a positive electrode slurry. The positive electrode slurry was applied and dried on a positive electrode current collector, which is an aluminum (Al) thin film, having a thickness of 15 μm, and subjected to roll pressing, thereby preparing a positive electrode. A loading level of the positive electrode was 10 mg/cm², and an electrode density was 3.2 g/cm³.

For the positive electrode, a lithium metal was used as a counter electrode, and an electrolyte solution was prepared by adding 1.15M $LiPF_6$ to a solvent in which ethylene carbonate (EC), ethyl methyl carbonate (EMC) and dimethyl carbonate (DMC) were mixed in a volume ratio of 2:4:4.

A lithium secondary battery (coin cell) was manufactured by forming a battery assembly by interposing a separator formed of a porous polyethylene (PE) film between the positive electrode and a negative electrode, and injecting the electrolyte solution thereinto.

(2) Evaluation of Capacity Characteristics of Lithium Secondary Battery

One cycle of charging was performed for the manufactured lithium secondary battery (coin cell) by charging until 4.25 V with a constant current (CC) of 0.15 C at 25° C., charging with a constant voltage (CV) of 4.25 V until a charge current becomes 0.05 mAh. Afterward, a discharge capacity of the lithium secondary battery at the first cycle was measured after being maintained for 20 minutes, and discharging with a constant current of 0.1 C until 3.0 V. The charge capacity, discharge capacity and charge/discharge efficiency in the first charging/discharging are shown in Table 4 below.

TABLE 4

| | Classification | | | |
| --- | --- | --- | --- | --- |
| | Charge capacity (mAh/g) | Discharge capacity (mAh/g) | Charge/ discharge efficiency (%) | 4.0 C/ 0.2 C rate characteristic (%) |
| Example 1 | 233.4 | 213.4 | 91.4 | 88.7 |
| Example 2 | 232.6 | 212.0 | 91.1 | 88.2 |
| Example 3 | 232.3 | 212.0 | 91.1 | 88.1 |
| Example 4 | 231.1 | 209.3 | 90.6 | 88.3 |
| Example 5 | 230.7 | 206.6 | 89.7 | 87.2 |
| Example 6 | 230.7 | 207.2 | 90.0 | 87.6 |
| Example 7 | 230.6 | 207.1 | 89.8 | 87.1 |
| Comparative Example 1 | 236.0 | 207.4 | 87.9 | 85.8 |
| Comparative Example 2 | 231.2 | 203.7 | 88.1 | 85.7 |
| Comparative Example 3 | 230.4 | 203.9 | 88.5 | 85.9 |
| Comparative Example 4 | 230.0 | 204.5 | 88.9 | 86.3 |

Referring to the results of Table 4, it can be confirmed that the lithium secondary batteries using the positive electrode active materials prepared according to Examples 1 to 7 are improved in charge/discharge efficiency and capacity characteristics, compared to the lithium secondary batteries using the positive electrode active materials prepared according to Comparative Examples 1 to 4. Particularly, it can be confirmed that, in Comparative Examples 2 to 4 in which composite oxides having $Li_aW_cO_d$, $W_cO_d$, and $Li_aNi_bW_cO_d$ compositions, respectively, are simply mixed with a composite oxide having a $Li_wNi_{1-(x+y+z)}Co_xAl_yW_zO_2$ composition, compared to the positive electrode active material simply having a $Li_wNi_{1(x+y+z)}Co_xAl_yW_zO_2$ composition (Comparative Example 1), charge/discharge efficiency and a 4.0 C/0.2 C rate characteristic were improved, but compared to an example in which a composite oxide having a $Li_aNi_bW_cO_d$ composition and a composite oxide having a $Li_wNi_{1(x+y+z)}Co_xAl_yW_zO_2$ composition form a solid solution, insufficient performance was exhibited.

In addition, as described above, lithium secondary batteries using positive electrode active materials prepared according to Examples 1 to 7 each including a solid solution may be improved in electrochemical characteristics compared to the Comparative Examples, and may also have reduced manufacturing process difficulty and process costs without adding a separate W-containing oxide, particularly compared to Comparative Examples 2 to 4.

(3) Evaluation of Stability of Lithium Secondary Battery

The lithium secondary batteries (coin cells) were subjected to 100 cycles of charging/discharging in the range of driving voltage from 3.0 to 4.25 V with a constant current (CC) of 1 C at 25° C. Accordingly, after 100 cycles of charging/discharging at room temperature, cycle capacity retention, which is a ratio of discharge capacity at the $100^{th}$ cycle to the initial capacity, was measured.

In addition, to confirm the high-temperature storage characteristics of the lithium secondary battery, a resistance was measured by charging the battery charged/discharged at 25° C. on the basis of SOC 100%, and then, after storage at 60° C. for 7 days, a resistance was measured to confirm the variation of the resistance.

The measurement results are shown in Table 5 below.

TABLE 5

| | | Classification | |
| --- | --- | --- | --- |
| | Capacity retention (%) | Resistance before high temperature storage (Ω) | Resistance after high temperature storage (Ω) |
| Example 1 | 89.3 | 2.8 | 15.1 |
| Example 2 | 88.8 | 3.1 | 15.9 |
| Example 3 | 88.2 | 3.0 | 16.0 |
| Example 4 | 89.2 | 2.9 | 14.9 |
| Example 5 | 87.4 | 3.7 | 17.3 |
| Example 6 | 87.0 | 3.8 | 17.0 |
| Example 7 | 88.0 | 3.4 | 16.7 |
| Comparative Example 1 | 85.5 | 5.7 | 49.7 |
| Comparative Example 2 | 86.0 | 5.2 | 30.0 |
| Comparative Example 3 | 86.2 | 4.5 | 25.8 |
| Comparative Example 4 | 86.8 | 4.2 | 18.5 |

Referring to the results of Table 5, it can be confirmed that the lithium secondary batteries using the positive electrode active materials prepared according to Examples 1 to 7 have excellent capacity retention and a small variation in the resistance before and after high temperature storage, compared to the lithium secondary batteries using the positive electrode active materials prepared according to Comparative Examples 1 to 4. Particularly, it can be confirmed that, in the cases of Comparative Examples 2 to 4 in which each of composite oxides having $Li_aNi_bW_cO_d$, $Li_aW_cO_d$ and $W_cO_d$ compositions and a composite oxide having a $Li_w$ $Ni_{1-(x+y+z)}Co_xAl_yW_zO_2$ composition are simply mixed, compared to the positive electrode active material simply having a $Li_wNi_{1-(x+y+z)}Co_xAl_yW_zO_2$ composition (Comparative Example 1), capacity retention and resistance characteristics were improved, but compared to an example in which the composite oxide having a $Li_aNi_bW_cO_d$ composition and the composite oxide having a $Li_wNi_{1-(x+y+z)}Co_xAl_yW_zO_2$ composition form a solid solution, insufficient performance was exhibited.

A positive electrode active material according to various exemplary embodiments of the present invention includes different types of composite oxides, and particularly, a second composite oxide can form a solid solution with at least a part of a first composite oxide, thereby improving structural stability and thermal stability (high-temperature storage stability) of the positive electrode active material.

In addition, the positive electrode active material having the above-described structure may be improved in lifespan characteristics, efficiency characteristics and electrochemical characteristics such as resistance of the positive electrode active material, compared to a conventional positive electrode active material, by improving lithium ion conductivity in the active material.

Above, while the examples of the present invention have been described, it will be understood by those of ordinary skill in the art that the present invention may be changed and modified in various ways by addition, alternation, or deletion of components without departing from the spirit of the present invention defined in the appended claims.

What is claimed is:

1. A positive electrode active material, comprising:
a single primary particle comprising both a first composite oxide and a second composite oxide, which are present in a state of forming one solid solution,
wherein:
the first composite oxide enables lithium intercalation and deintercalation and has a first crystal structure belonging to a hexagonal crystal system; and
the second composite oxide presents on at least a part of the surface of the first composite oxide and has a second crystal structure having at least one crystal structure selected from monoclinic, triclinic and cubic systems, and
wherein
the first composite oxide is represented by Formula 2 below:

$$Li_wNi_{1-(x+y+z)}Co_xM3_yM4_zO_2 \qquad \text{[Formula 2]}$$

(Here,
M3 is Al,
M4 is at least one selected from Al, Ti, Zr, Mg, V, B, Mo, Zn, Nb, Ba, Ta, Fe, Cr, Sn, Hf, Ce, W, Nd and Gd,
$0.5 \le w \le 1.2$, $0.01 \le x \le 0.50, 0.01 \le y \le 0.20$, and $0.001 \le z \le 0.20$), and
the second composite oxide is represented by Formula 1 below:

$$Li_aNi_bM2_cO_d \qquad \text{[Formula 1]}$$

(Here,
M2 is at least one selected from Al, Zr, Mg, V, B, Mo, Zn, Ba, Ta, Fe, Cr, Sn, Hf, Ce, W, Nd and Gd,
$0 \le a \le 6$, $0 < b \le 2$, $0 < c \le 2$, and $4 \le d \le 8$),
wherein the positive electrode active material exhibits both of a diffraction peak pattern specific for the first composite oxide and a diffraction peak pattern specific for the second composite oxide, wherein, in X-ray photoelectron spectroscopy (XPS) analysis for the solid solution, peaks corresponding to $W4f_{7/2}$ are present in a range of 34.0 eV to 35.0 eV and in a range exceeding 35.0 eV, respectively,
wherein, in X-ray photoelectron spectroscopy (XPS) analysis for the solid solution, peaks corresponding to $W4f_{5/2}$ are present in a range of 36.0 eV to 37.0 eV and in a range exceeding 37.0 eV, respectively,
wherein the single primary particle is core-shell particle, comprising:
a core including the first composite oxide; and
a shell layer including the second composite oxide,
wherein the average diameter of the core-shell particle is 0.1 to 6.0 μm, and the thickness of the shell layer is 20 nm or less.

2. The positive electrode active material of claim 1, wherein the second composite oxide present in the shell layer is a lithium-rich metal oxide.

3. The positive electrode active material of claim 1, wherein the positive electrode active material comprises the core-shell particles and a secondary particle formed by aggregating the core-shell particles.

4. The positive electrode active material of claim 1, wherein the solid solution is represented by Formula 3 below:

$$Li_aNi_bM2_cO_d\!-\!Li_wNi_{1-(x+y+z)}Co_xM3_yM4_zO_2 \quad \text{[Formula 3]}$$

(Here,

M2 is at least one selected from Al, Zr, Mg, V, B, Mo, Zn, Nb, Ba, Ta, Fe, Cr, Sn, Hf, Ce, W, Nd and Gd, M3 is Al, M4 is at least one selected from Al, Ti, Zr, Mg, V, B, Mo, Zn, Ba, Ta, Fe, Cr, Sn, Hf, Ce, W, Nd and Gd, $0 \leq a \leq 6, 0 < b \leq 2, 0 < c \leq 2, 4 \leq d \leq 8, 0.5 \leq w \leq 1.5, 0.01 \leq x \leq 0.50, 0.01 \leq y \leq 0.20$, and $0.001 \leq z \leq 0.20$).

5. The positive electrode active material of claim 4, wherein M2 is the same as M4 or a part of M4.

6. The positive electrode active material of claim 3, further comprising:

a coating layer covering at least a part of the secondary particle, wherein the coating layer includes an alloy oxide represented by Formula 4 below:

$$Li_eM5_fO_g \quad \text{[Formula 4]}$$

(Here, M5 is at least one selected from Mn, Al, Ti, Zr, Mg, V, B, Mo, Zn, Nb, Ba, Ca, Ta, Fe, Cr, Sn, Hf, Ce, W, Nd and Gd, $0 \leq e \leq 6$, $0 < f \leq 6$, and $0 < g \leq 10$).

7. A lithium secondary battery comprising a positive electrode including the positive electrode active material of claim 1.

8. A positive electrode active material, comprising:

a single primary particle comprising both a first composite oxide and a second composite oxide, which are present in a state of forming one solid solution, wherein:

the first composite oxide enables lithium intercalation and deintercalation and has a first crystal structure belonging to a hexagonal crystal system; and the second composite oxide presents on at least a part of the surface of the first composite oxide and has a second crystal structure having at least one crystal structure selected from monoclinic, triclinic and cubic systems, and wherein the first composite oxide is represented by Formula 2 below:

$$Li_wNi_{1-(x+y+z)}Co_xM3_yM4_zO_2 \quad \text{[Formula 2]}$$

(Here,

M3 is Al,

M4 is at least one selected from Al, Ti, Zr, Mg, V, B, Mo, Zn, Nb, Ba, Ta, Fe, Cr, Sn, Hf, Ce, W, Nd and Gd, $0.5 \leq w \leq 1.2, 0.01 \leq x \leq 0.50, 0.01 \leq y \leq 0.20$, and $0.001 \leq z \leq 0.20$), and the second composite oxide is represented by Formula 1 below:

$$Li_aNi_bM2_cO_d \quad \text{[Formula 1]}$$

(Here,

M2 is W or a combination of W and at least one selected from Al, Zr, Mg, V, B, Mo, Zn, Ba, Ta, Fe, Cr, Sn, Hf, Ce, Nd and Gd, $0 \leq a \leq 6$, $0 < b \leq 2$, $0 < c \leq 2$, and $4 \leq d \leq 8$),

26 wherein the positive electrode active material exhibits both of a diffraction peak pattern specific for the first composite oxide and a diffraction peak pattern specific for the second composite oxide, wherein, in X-ray photoelectron spectroscopy (XPS) analysis for the solid solution, peaks corresponding to $W4f_{7/2}$ are present in a range of 34.0 eV to 35.0 eV and in a range exceeding 35.0 eV, respectively, wherein, in X-ray photoelectron spectroscopy (XPS) analysis for the solid solution, peaks corresponding to $W4f_{5/2}$ are present in a range of 36.0 eV to 37.0 eV and in a range exceeding 37.0 eV, respectively, wherein the single primary particle is core-shell particle, comprising:

a core including the first composite oxide; and a shell layer including the second composite oxide, wherein the average diameter of the core-shell particle is 0.1 to 6.0 μm, and the thickness of the shell layer is 20 nm or less.

9. A positive electrode active material, comprising:

a single primary particle comprising both a first composite oxide and a second composite oxide, which are present in a state of forming one solid solution, wherein:

the first composite oxide enables lithium intercalation and deintercalation and has a first crystal structure belonging to a hexagonal crystal system; and the second composite oxide presents on at least a part of the surface of the first composite oxide and has a second crystal structure has at least one crystal structure selected from monoclinic, triclinic and cubic systems, and wherein the first composite oxide is represented by Formula 2 below:

$$Li_wNi_{1-(x+y+z)}Co_xM3_yM4_zO_2 \quad \text{[Formula 2]}$$

(Here, M3 is at least one selected from Mn and Al, M4 is at least one selected from Mn, Al, Ti, Zr, Mg, V, B, Mo, Zn, Nb, Ba, Ta, Fe, Cr, Sn, Hf, Ce, W, Nd and Gd, $0.5 \leq w \leq 1.2, 0.01 \leq x \leq 0.50, 0.01 \leq y \leq 0.20$, and $0.001 \leq z \leq 0.20$), the second composite oxide is represented by Formula 1 below:

$$Li_aNi_bM2_cO_d \quad \text{[Formula 1]}$$

(Here,

M2 is at least one selected from Al, Zr, Mg, V, B, Mo, Zn, Ba, Ta, Fe, Cr, Sn, Hf, Ce, W, Nd and Gd, $0 \leq a \leq 6$, $0 < b \leq 2$, $0 < c \leq 2$, and $4 \leq d \leq 8$), and wherein the positive electrode active material exhibits both of a diffraction peak pattern specific for the first composite oxide and a diffraction peak pattern specific for the second composite oxide, wherein, in X-ray photoelectron spectroscopy (XPS) analysis for the solid solution, peaks corresponding to $W4f_{7/2}$ are present in a range of 34.0 eV to 35.0 eV and in a range exceeding 35.0 eV, respectively, wherein, in X-ray photoelectron spectroscopy (XPS) analysis for the solid solution, peaks corresponding to $W4f_{5/2}$ are present in a range of 36.0 eV to 37.0 eV and in a range exceeding 37.0 eV, respectively, wherein the single primary particle is core-shell particle, comprising:

a core including the first composite oxide; and a shell layer including the second composite oxide, wherein the average diameter of the core-shell particle is 0.1 to 6.0 μm, and the thickness of the shell layer is 20 nm or less.

\* \* \* \* \*